United States Patent

McComb et al.

[11] Patent Number: 6,049,673
[45] Date of Patent: *Apr. 11, 2000

[54] ORGANICWARE APPLICATIONS FOR COMPUTER SYSTEMS

[75] Inventors: David W. McComb; James L. Long; Simon Hoare, all of Fort Collins, Colo.

[73] Assignee: Organicnet, Inc., San Francisco, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/023,036

[22] Filed: Feb. 13, 1998

Related U.S. Application Data

[60] Provisional application No. 60/038,387, Feb. 14, 1997, provisional application No. 60/037,941, Feb. 14, 1997, and provisional application No. 60/038,390, Feb. 14, 1997.

[51] Int. Cl.[7] .................................................... G06F 9/445
[52] U.S. Cl. .............................................................. 395/712
[58] Field of Search ..................................... 395/712, 761, 395/683, 600, 700, 701

[56] References Cited

U.S. PATENT DOCUMENTS

| | | | |
|---|---|---|---|
| 4,688,195 | 8/1987 | Thompson et al. | 706/11 |
| 5,187,787 | 2/1993 | Skeen et al. | 395/600 |
| 5,465,362 | 11/1995 | Orton et al. | 709/107 |
| 5,481,721 | 1/1996 | Serlet et al. | 395/700 |
| 5,566,278 | 10/1996 | Patel et al. | 395/114 |
| 5,638,504 | 6/1997 | Scott et al. | 395/7.61 |
| 5,668,997 | 9/1997 | Lynch-Freshner et al. | 709/303 |
| 5,732,270 | 3/1998 | Foody et al. | 395/683 |
| 5,787,413 | 7/1998 | Kauffman et al. | 707/2 |
| 5,822,580 | 10/1998 | Leung | 707/103 |
| 5,893,106 | 4/1999 | Brobst et al. | 707/102 |
| 5,936,860 | 8/1999 | Arnold et al. | 395/701 |
| 5,973,702 | 10/1999 | Orton et al. | 345/433 |

OTHER PUBLICATIONS

Title: Object–Oriented Remote Dispatch for a Client/Server Implementation, IBM Technical Disclosure Bulletin, Dec. 1996.
Title: Object Oriented User Administration, IBM Technical Diosclosure Bulletin, May 1992.
Design of the Application Collection Object for Network Installation, IBM Technical Disclosure Bulletin, May 1996.
Mechanism for using system object model metaclass to customize initialization, IBM Technical Disclosure Bulletin, Mar. 1995.
Title: Eco System: An Internet Commerce Architecture, Author: Tenebaum et al, Computer, 1997.

*Primary Examiner*—Tariq R. Hafiz
*Assistant Examiner*—Chamel J Chaudhuridas
*Attorney, Agent, or Firm*—Stuart T. Langley; Holland & Hart LLP

[57] ABSTRACT

A method for implementing a software application by shifting all the definition of an application into data, which need not be translated to code to be run, which is run by code which remains the same from application to application.

9 Claims, 18 Drawing Sheets

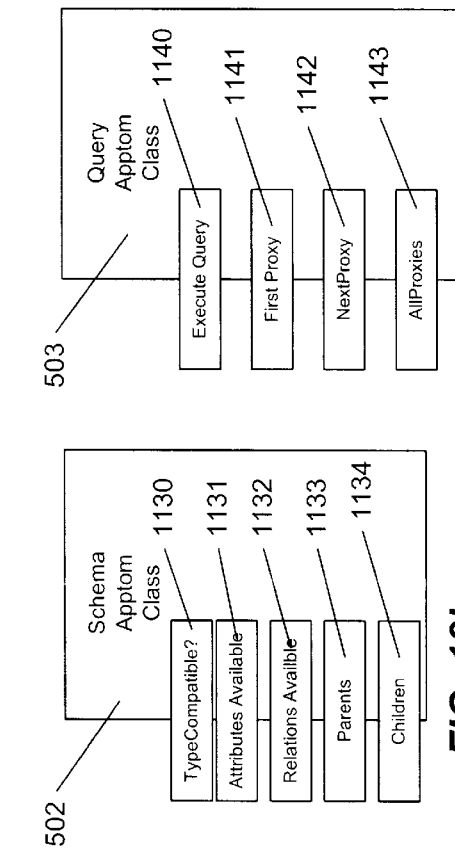
FIG. 12c
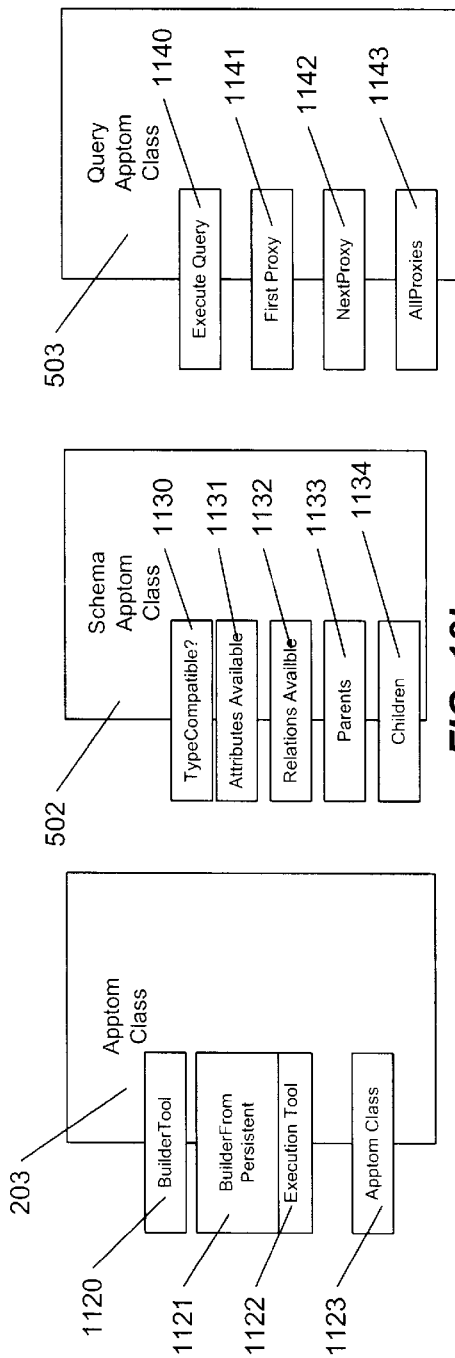
FIG. 12b
FIG. 12a
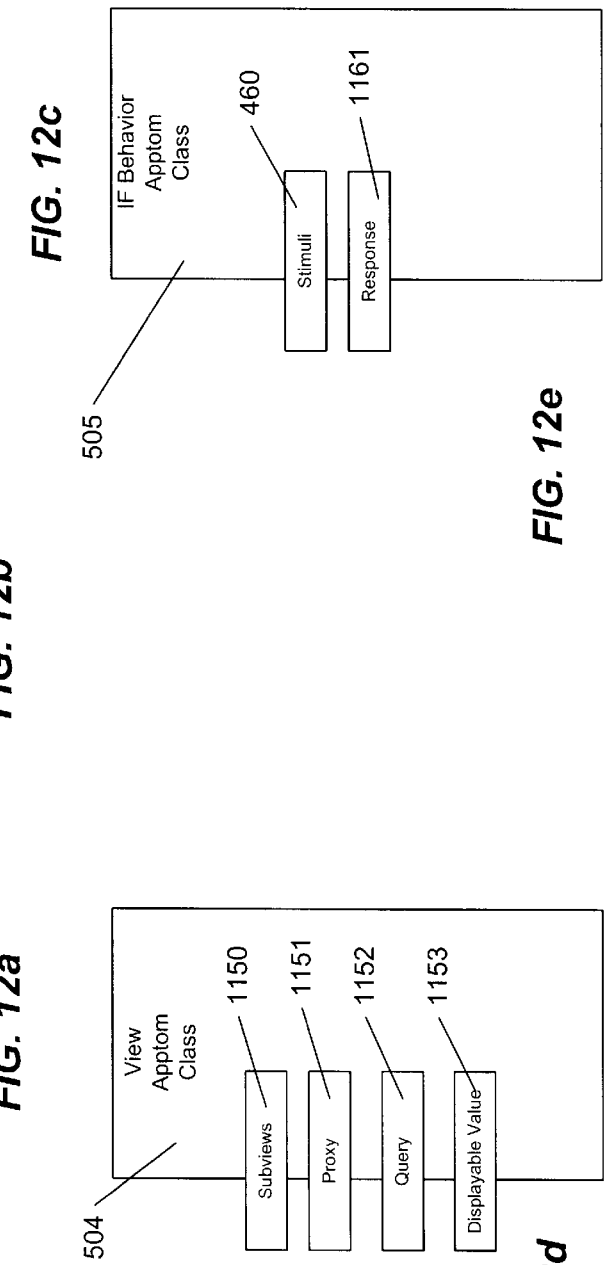
FIG. 12e
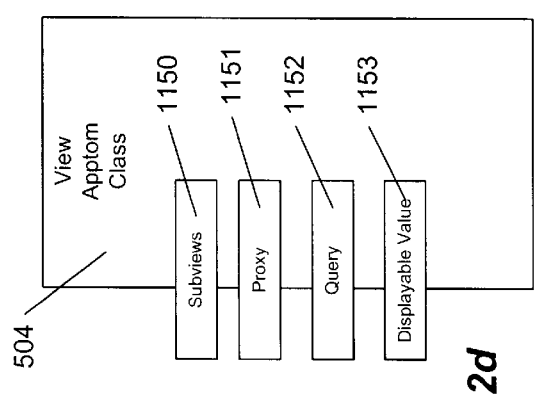
FIG. 12d

ORGANICWARE APPLICATIONS FOR COMPUTER SYSTEMS

1. RELATED APPLICATIONS

The present invention relates to and claims priority from United States Provisional Application No. 60/038,387 entitled "SOFTWARE APPLICATIONS AS DATA" filed on Feb. 14, 1997, United States Provisional Application No. 60/037,941 entitled "CRUCIBLE QUERY SYSTEM" filed on Feb. 14, 1997, and United States Provisional Application No. 60/038,390 entitled "DEVICE INDEPENDENT WINDOW LAYOUT FOR GRAPHICAL DISPLAY OF INFORMATION" filed on Feb. 14, 1997.

The present invention relates to U.S. Patent application Ser. No. 09/023,167 entitled "CRUCIBLE QUERY SYSTEM", and U.S. Patent application Ser. No. 09/023,364 entitled "DEVICE INDEPENDENT WINDOW LAYOUT FOR GRAPHICAL DISPLAY OF INFORMATION", all assigned to the assignee of the present invention, filed concurrently herewith, the teachings of which are incorporated herein by reference in their entirety.

BACKGROUND OF THE INVENTION

2. Field of the Invention

The present invention relates, in general, to software applications, and, more particularly, to a system and method for generating, storing, and using software applications that are represented as data without procedural code.

3. Relevant Background

Although the field of software development is characterized by rapid change, a significant problem leading to the obsolescence of software applications is the inability for an application system itself to change. Software applications offer a set of features, behavior, and user interfaces that define the application. These applications operate on a hardware platform through an operating system adapted specifically to that hardware platform. Typical applications attempt to optimize performance by customizing at least portions of the application code for a particular hardware platform or operating system. These optimizations, however, make the application dependent on the hardware and operating system so that the application must be rewritten in response to hardware and operating system changes.

The conventional approach has been to closely couple a applications to the operating system in an effort to minimize performance and speed. However, by closely binding the application to the operating system, small changes or hardware evolution often require that both the application and the operating system be modified. Also, application specific interfaces to the application are making it difficult to create inter-operable and extensible applications. Further, the application specific management software is difficult to reuse in diverse applications.

Industry spends hundreds of billions annually on business application software development and maintenance (systems such as payroll or inventory control for instance). The average new application in major corporations comprises over 2,000,000 lines of application program code, and takes over two years to develop. The state of the art software development methodologies are all variations on: get a good set of requirements for the problem to be solved, design the data model and the application code to operate on it, then program and test until the requirements have been addressed. The best approaches are noted for eliciting more of the requirements up front and/or losing less of the problem definition in the many translations from requirements to design and design to code.

There have been prior attempts to reduce the complexity of this process. One of the most popular and successful has been to generate the application code from a complete model of the solution. Another is to parameterize parts of the system. Still another is to treat lines of code like data. These prior efforts are discussed briefly in turn.

Computer Aided Software Engineering (CASE) tools assist in modeling project functions, information flows, data entities and other information regarding the proposed system requirements. CASE tools and many other tools approach the software development problem by creating a model of the problem to be solved and then generating the code to solve it. While this does an adequate job of addressing the problem, it does not do an optimal job. The CASE tool requires the practitioner to define the problem in a very specific fashion, which then goes through a specific translation to a specific target architecture. In many cases they form a pictorial representation of the control structures described below under programming. While this solution offers some advantages, it still relies on implementing the application as coded program logic. More importantly, once such a system is constructed, it is basically a monolith, it is the same application for all users and any proposed changes must go through the CASE generation process again.

The second prior approach is parametric construction or execution. Parametric approaches offer good performance in narrowly defined application domains where the data characteristics and application behavior are well understood and characterized. For example, parametric CAD systems take the approach that key variables can be substituted for parts of a mechanical design and generate the rest. The inventors of the present invention are aware of a prior system that accepted parametric adjustment of some standard program designs as a way to generate code rapidly. In referring to the programming analysis above, the parametric approach is essentially a process of selecting at precompile time which of a predefined set of already coded application code segments will be executed.

With the popularity of Smalltalk, and more recently Java™ (a trademark or registered trademark of Sun Microsystems, Inc. in the United States and other countries.), has been a resurgence in interpreted languages, and with them a notion that the code can be stored and treated as data. In an interpreted language each line of code can be stored as data (e.g., bytecodes in Java) and invoked at run time. An interpreter receives the data and converts it to machine executable code. At one level the code is like data, it is stored in a database and does not need to be part of a compiled and linked executable. But in every other regard it still procedural code, subject to all the flow of control, and need for testing as any other program code. Indeed the testing need is even greater as there is no way to exhaustively demonstrate the correctness of a program where flow of control logic can be changed at any time.

Conventional applications, even object oriented applications, are deployed as procedural code. A typical application comprises a plurality of modules that each perform a specified set of tasks. These modules are linked and compiled to provide executable code that implements the application. At runtime, the executable code is loaded into machine memory and provides the applications features and behavior by executing the specified set of tasks in the machine. Program compilation occurs before the application is deployed such that the application cannot be fundamentally changed at runtime. Interpreted language applications differ from conventional applications in that they are stored as a collection of "byte-codes" that are interpreted at runtime to generate the procedural executable. In a sense, these applications postpone the compilation process (i.e., the process that translates data into procedural code) until runtime, but do not otherwise change conventional implementation of software applications.

As software complexity increases, verification of the functionality (i.e., the features and behavior of the software) has become problematic. When an application comprises thousands or millions of lines of code it becomes impracticable to test or simulate every possible failure mode. Until applications are actually used in their intended environment, many problems or limitations remain unknown. This increases the cost of maintenance and support for the application. In many mission critical applications (e.g., medical, financial, and security) it is vital that an application be implemented only after verification is complete. What is needed is a reliable system that can adapt to provide new functionality without the delays and cost imposed by software verification.

The last several decades have been characterized by rapid change in computing hardware and an increase in operating system complexity to provide new functionality and exploit features of improved hardware. Consequently, software applications written to cooperate closely with the OS or hardware have extremely short product life cycles. Moreover, hardware and OS manufacturers often limit the improvements that are made so that their hardware remains inter-operable with a sizable base of installed software applications. Hence, the inability described above of software applications to evolve results in a chilling effect on the entire computer industry.

SUMMARY OF THE INVENTION

Briefly stated, the present invention solves these and other limitations of the prior art by shifting all the definition of an application into data, which need not be translated to code to be run, which is run by code which remains the same from application to application. In one aspect, the present invention involves a method for implementing a software application by storing an essential description of the application as data apptoms in a persistent store. The apptoms are instantiated as proxy objects at run time. The proxy objects are connected in such a manner so as to have a fully functional software application. In this manner, changes to the application are made by data entry rather than programming, eliminating a need for application programming and application system testing.

In another aspect the present invention involves a software application including a model of a business application, expressed in data and stored in persistent storage. An application-independent architectural program makes the model real by creating an instance of the application in memory of a computer system. When running, the architectural program causes the user of the system to experience the use of a complete software application, for which there was no need to write or generate application specific programming code.

BRIEF DESCRIPTION OF THE DRAWINGS

FIG. 12 shows key interfaces for the five Apptom Classes shown in FIG. 10; and

DETAILED DESCRIPTION OF THE PREFERRED EMBODIMENTS

Overview

Figure 1:
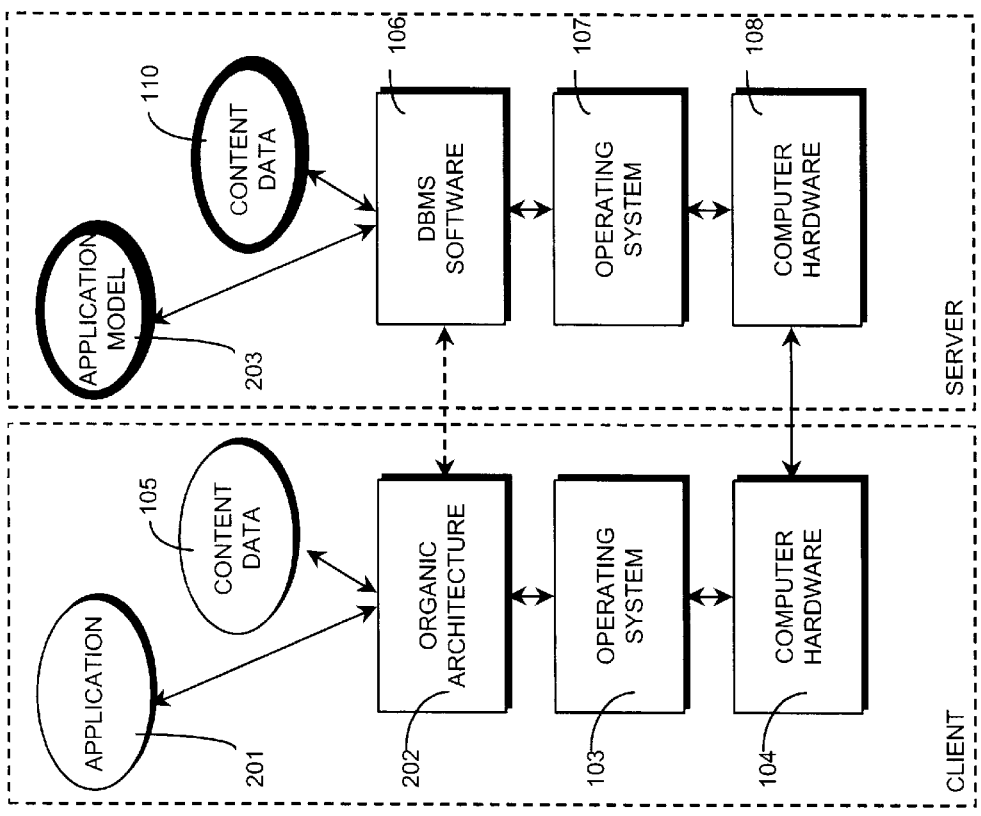
FIG. 1 (Prior Art) shows in block diagram form a prior art computer system architecture implementing application software.

The present invention relates to an arrangement of software components and data, which are together referred to as OrganicWare™ applications that allows functionality provided by traditional business software applications to be developed and maintained without any programming. OrganicWare is a trademark of Object Products, Inc. The present invention allows a great reduction in cost to develop and maintain software applications while error rates drop substantially. Applications developed in accordance with the teachings of the present invention can outlive any technological architecture (i.e. hardware platform or operating system) on which it is currently running, and systems can be enhanced and upgraded while they are being used.

One of the key aspects of OrganicWare applications is the ability to re-express what has traditionally been program code in the form of data. Hence, to understand the description of the present invention and the drawings it is important to distinguish between programs and data. It is also important to distinguish between objects in a database and objects in memory of a computer system. Traditional object-oriented languages (e.g., C++, Smalltalk, and Java) create objects in memory, and must rely on other mechanisms to make these objects persistent in a database.

A significant premise in accordance with the present invention is that it is possible to take an application domain where applications have traditionally been developed by application programming, and using the methods of invention described herein, construct a new application, where the new application is expressed entirely as data. The new application is subject to the same laws of integrity as data. The present invention involves an application development approach that is designed with a realization that any application running on the system is not only a fixed set of features and behavior, but also comprises all of the changes applied to the system throughout its lifetime. In other words, the architecture in accordance with the present invention anticipates that changes will occur even if the features and behavior modified by those changes is unknown today.

In accordance with the present invention, queries, business rules, interfaces, reports, actions, events and other component entities that define an application are all stored as completely decomposed database entries. This data is retrieved and used at runtime by a client 303 (shown in FIG. 3) in accordance with the present invention to cause the client 303 to provide the desired application functionality and behavior. In this manner, the system in accordance with the present invention is readily modified to the practices of individual users and to the business practices of a particular organization while it is running.

Fundamental Differences Between Data and Programs

Data and programs share many characteristics, and at times are difficult to distinguish, however there are some key differences that are important to a complete understanding of the present invention. Data, or a datum element is a machine readable representation of a number, letters or words, a picture, a sound, or the like. It can represent some measured or interpreted value from the "real world" or some state or other information about the world of the computer application. It can have a domain of valid values, it can be composed of other data and it can be related to other data.

A program is a series of machine executable instructions. Each instruction may change the value of some data element, or it may respond to an external source of information, may direct some external expression of information, may cause the movement of something physical in the world, or it may cause a change in the flow of control in the program (which instruction will get executed next).

A program gets its power from its arrangement of a few simple constructs including 1) Sequence; 2) Selection; 3) Iteration; and 4) External Routine Invocation. Each of these elements is described in turn below.

1) Sequence

The most basic type of control flow is sequence. Each instruction is executed in the order they are written or saved in a stored program. Instructions are presented sequentially to a processor for execution. Although some hardware (and feasibly software) environments allow out-of-order execution and speculative execution of instructions, the results from these instructions are always retired or made persistent in the program order to maintain program sequence.

2) Selection

Selection refers to program features that enable program execution to continue at a specified point within the program. For example, a conditional branch causes the flow of control to change depending on the value of a particular variable, at the time the branch instruction is executed. An unconditional branch causes flow control to change to a new location without regard to the state of other variables. Once the flow control has changed, sequential instruction execution resumes.

3) Iteration

Looping adds the possibility that the same sequence of steps may be repeated until a particular variable reaches a certain state.

4) Looping

External Routine Invocation refers to a programs ability to call other programs. In this manner, all the program code need not be contiguous within a single program. Any of the above constructs, or complex combinations of them, can be stored in separate routines, which can then be called from other statements and upon completion have flow control return to where the routine was called.

Object-oriented software is essentially a refinement of the construct of invoking stored routines, with some additional rules about exactly which routine gets executed at run time as determined by the type of the data being operated on.

The essence of a program is the flow of control and the change in state of the data is within the purview and control of the program code. When an application is built out of program elements ("Application Programming" as it is generally called) it is built by creating and arranging these program elements in a specific, carefully controlled manner to meet the needs of the application at hand.

Data is made up of and subject to different rules than programs. Data is made up of: 1) Objects and Identity; 2) Attribute values; 3) Attribute Domains; and 4) Relationships. Each of these items is discussed in turn below.

1. Objects and Identity

Each piece of data is about some "thing" which may have a real world counterpart or not. The "thing" has an identity and a scope. The identity could be a variable name within a program, a memory location, an object ID in an object database or a key in a relational database or keyed file. The scope determines how large a context the identity is guaranteed to represent a specific object.

2. Attribute values

Any value that can be assigned to a given data object. A name or a birth date could be attributes of a person object.

3. Attribute Domains

A definition of all the possible valid attribute values for a given named attribute. Defines both the type of data (e.g., numeric, characters or bit streams) and ranges, enumeration's or rules for validity.

4. Relationships

The term relationship refers to an identified or specified association between two data objects. Relationships can be expressed in externally visible data values (as an inventory part number on an order creates a relationship between the order and the warehousable inventory item) or by explicit association, as in making a link between objects in an object database. "Relationship constraints" are rules about the types and numbers of objects that may be related via particular named relationships. For example, the named relationship "employed by" may require that the relationship be between a legal entity and an individual. Any attempts to associate a table with a chair via this relationship would be invalid.

By its nature, data is subject to management via "data integrity" techniques. The existence of fully expressed data integrity makes it possible to guarantee that all current and future values of data of a particular type will be "valid" with regard to the data integrity constraints. Moreover, it is possible to ensure that no valid data will be any more valid than any other. There may still be issues regarding accuracy of data (to what degree does it correspond to its equivalent real world representation) but that does not affect its internal integrity. Data integrity basically takes the form of assuring that all the attribute values fall within their corresponding attribute domains and that all relationships have satisfied their relationship constraints.

There have been many efforts to formally "prove" computer programs. Only the very simplest are subject to proof. As a result, programs are subject to correctness via demonstration and testing. The testing typically takes a very large set of possible input data sets and attempts to demonstrate that the program behaves as intended. Due to the looping and branching and other flow of control issues it is not practical to prove the correctness of a program in the same manner as you can assure the validity of data. Because of the need to demonstrate and test correctness of programs and because even the smallest change to the logic of a program can have widespread repercussions, it is not possible to change programs "on the fly" and have any confidence in their ability to run correctly. In environments where the application or portions of the application are shared, the adverse effects are even more problematic.

Definitions

For purposes interpreting the specification and claims of the present invention, the following are used:

OrganicWare™ Application—a highly structured data that when executed within a conforming architectural program, such as the organic architecture in accordance with the present invention, implements a fully functioning software application. OrganicWare applications are analogous to traditional application software in many ways, but it are malleable and can be change like ordinary data, which they are. OrganicWare is a trademark of Object Products, Inc.

Architectural Program—a software program that has no application-specific references. As and example, in an inventory control system an architectural program would be one that has no reference to inventory or warehouses or vendors or anything related to the business application.

Organic Architecture—A collection of architectural programs that are responsive to data to create instances of an application defined by the applied data.

Software Application—a set of computer programs and related data, typically directed at the solution of a specific problem, most commonly in a business or organizational setting, and generally allowing access by multiple users. Software applications do not include operating system, compilers or software tools such as Database Management Systems. Shrink wrapped PC software typically is a type of Software Application, however the primary focus of the present invention is on larger scale multi-user, transaction and database oriented systems. Examples include inventory control systems, accounting systems, medical records systems, document management systems, billing systems. The present invention also focuses on software applications that have significant user interfaces.

Business Application—A set of processes, steps and methods that a business goes through to carry out some activity related to its business. Currently, many portions of a business application are computerized, but this is not a requirement as the term is used herein.

Model—a representation of something in the real world.

Program code—Procedural or declarative code. Interpreted, source code or compiled object code are considered program code.

Persistent Storage—A non-volatile memory capable of saving data between invocations of a program. Databases and File systems are two common forms of persistent storage.

Applet—A small part of an application that can be distributed economically. Programs written in the Java™ language are often organized into Applets. An Applet might bring a form on a screen, spell check a document, refill a prescription. Applets are small programs, which can often be interpreted at run time.

Data Apptoms—An "atomic" level decomposition of data about an application. Data apptoms are arranged in classes where each member of a class shares attributes and/or relationships and/or responsibilities. Data apptoms comprise only data and desirably include only a quantity of data sufficient to enable the apptom to be referenced by another apptom and maintain its identity with its class. Apptoms have a granularity selected such that any finer granularity would cause the data to lose its ability to represent the responsibilities of its class. In other words, if an apptom were divided into any smaller portions those portions would lose their identity with respect to the class with which they are members. Apptoms are smaller than an Applet. An apptom is associated with a class and contains neither procedural code nor procedural coding constructs.

Class (generic)—In an object-oriented system, each class defines the layout and programmed behavior of a "class" of objects, that it will create or instantiate. The class defines the structure of the data that each object of that class will maintain, and the application program interface (API) that each object of that class will respond to. It also contains the code that will be executed when the API is invoked.

API—Application Program Interface, for a platform such as a windowing system the API is the set of all program function calls that can be made to the platform by another program. For a class it is the set of all program function calls (i.e., methods) that another class can invoke on instance of the first class.

Database Class—a class that defines a set of database instances that share a specified definition of attributes and relationships.

Relational Database—A database that stores its data in tables, columns and rows.

Object Oriented Database—A database that stores its data in objects, with attributes and relations. An object-oriented database supports inheritance and polymorphism.

Database Instance—A single object, persisted, that is analogous to a row in a relational database.

Object—An in memory representation of a single instance of a class.

Procedural Code—data that must be interpreted or compiled to provide set of programming language statements that can be executed by a computer, and include sequence, branch and looping.

Declarative Code—Code that obeys a regular syntax, but does not have a looping structure (e.g., structured query language or SQL).

Proxy Object—An anonymous, or chameleon-like object that acts as a wrapper or disguise for another contained virtual object. To its class system a proxy object appears to be an object of the class "Proxy," however it can be interrogated via its API and asked for the identity of its virtual class.

Type—When referring to an object, the word type means a class or any of its superclass. When referring to an attribute, the word type means the semantic type (i.e., numeric, text, double-precision numeric, etc.).

Class Map—An arrangement of apptoms that describes the persistent class structure, as well as validation rules for the persistent class structure and some clues or default settings describing how to display information (e.g., date display format). The class map is also referred to as the logical schema.

Physical Schema—How the physical database or other persistent store system physically stores the data. It is not important to the present invention whether the physical schema has the same structure as the logical schema.

Run time—When the user is executing the software application, as opposed to "compile time" when the application developer created the program.

Fully Functional Software Application—a software application that has the scope and range of behavior and user interface features that a typical user in the target audience would expect.

Referential Integrity (RI)—Property of enforcement of rules of relationship between objects (or rows in a relational database). A system with referential integrity can prevent object (or row) updates that would violate validation rules, even if the user who initiated the update has not instantiated or may not even have access to the other objects in question. For instance a RI constraint between vendors and purchase orders might say that every purchase order must have a valid vendor. If someone attempts to delete a vendor who has outstanding purchase orders, a system with (RI) will stop the update, even if the person who wrote the program that did the update is unaware of the constraint.

Content Data—for example, a persons name and social security number would be content data, as would their blood pressure reading. However the present invention distinguishes content data from Apptoms, such as some data about which views a particular user will see, and what information will be in those views.

Components of an Application—all the apptoms, required data, proxies, architectural classes required to create and run an application.

Constrained Choice Interfaces—Interface development technique where a user is only presented will valid choices to select from. Most syntactical interfaces allow a user to type something and then evaluate its correctness or incorrectness.

Fundamental Improvements

Figure 2:
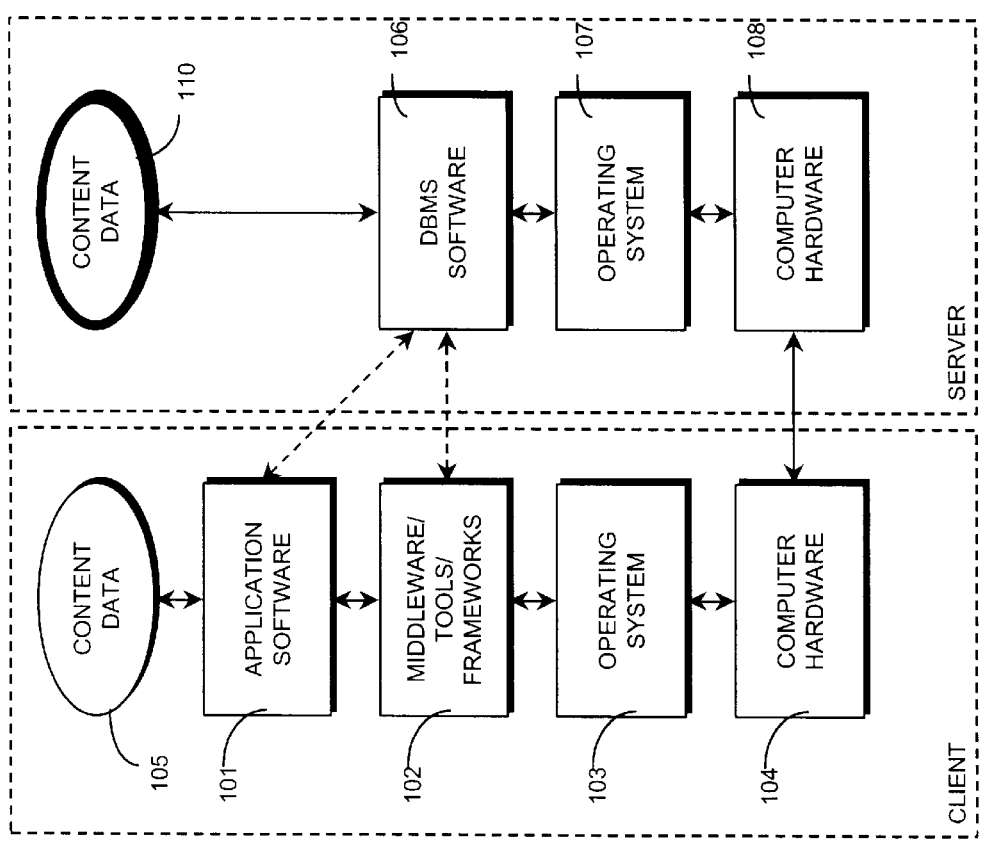
FIG. 2 shows in block diagram a computer system architecture for implementing an OrganicWare application in accordance with the present invention.

A comparison of the present invention with prior art application implementation systems is described in terms of the block diagrams shown in FIG. 1 and FIG. 2. In general the round elements in the figures, including rounded boxes, are data. Data elements shown in bold lines are persistent, meaning that they are saved in non-volatile memory of some kind. Boxes with square corners represent program code. Lines without arrows between elements represent relationships between the respective elements. Lines with arrow represent communication channels between the respective elements in the direction(s) specified with the arrows. Solid lines indicate physical communication channels whereas dashed lines indicate virtual or logical communication channels between the components.

FIG. 1 shows a high level block diagram of a prior art software application implementation. FIG. 1 and FIG. 2 show implementation in a classic client/server architecture where the user interface is provided on a client computer, and the data persistence is provided on a server computer. However, the architecture is substantially equivalent even if both functions are performed on a single computer. In a single computer system implementation, the computer hardware (104 and 108) are shared and operating system (103 and 107) are shared. DBMS component 106 is equivalent to a file system in a simpler computer architecture.

The prior art system shown in FIG. 1 includes middleware/framework component 102 operating on operating system 103. Most software being developed currently has some form of middleware, framework or tool support, hence, FIG. 1 is a representative picture, however the middleware is not essential.

A traditional software application 101 is shown in FIG. 1. In a "fat client" implementation all of software application 101 is located on the client computer system. Alternatively, in a "thin client" implementation some of the application code is on the server computer but the prior art application software 101 still involves programming code. Businesses spend hundreds of billions of dollars every year building and maintaining application specific software such as application software 101.

In the prior art system shown in FIG. 1 content data 110 is stored persistently in the database in the server computer system in between invocations of the application software 101. At application run time, copies of the content data are transferred to memory (e.g., a DRAM memory bank) in the client computer system such that content data 105 exists in a portion of the memory assigned to software application 101 while the client computer system is running.

A comparison of FIG. 1 with FIG. 2 shows an essential difference between the instant invention and the prior art: in FIG. 2 application software 101 is replaced by application data 201. The data that defines the application is stored in application model 203 in the database on the server computer system along with the content data 110 (also referred to as "content"). Note that the organic architecture component 202 replaces the middleware 102 of the prior art system shown in FIG. 1. The application model data 203 and the content data 110 represent two distinct types of data. At runtime, a copy of content data 110 is brought into memory as content data 105 in a manner similar to that described in FIG. 1. However, data from application model 203 is brought into memory in the client to provide application data 201 in accordance with the present invention.

Data processors such as microprocessors and microcontrollers within computer hardware 104 (shown in FIG. 1) operate by executing instructions therefore all application functionality involves some program code that drives these processors. In accordance with the present invention, organic architecture component 202 provides this program code. Organic architecture 202 comprises application-neutral program code in that it does not implement any application-specific functionality or behavior. In contrast, the program code in organic architecture component 202 comprises code (or groups of code segments) that creates or instantiates an application in the memory of the client computer system where the behavior of that application is determined by the data it is given at run time from application data 201. Application data 201 defines the application behavior, whereas the code in organic architecture component 202 serves as a tool for creating an instance of the application 201.

It is important to distinguish the present invention from interpretive code applications such as Java. In an interpreted application, the data received by a virtual machine is interpreted to generate application code in the client computer system. In these systems, the code that is received is interpreted from a machine-independent language (e.g., Java bytecodes) to a machine-dependent language or instructions. Hence, the original un-interpreted code is still responsible for executing the application correctly.

In contrast, the data from application model 203, in the form of apptoms, is received by organic architecture 202 and used to create an instance of application 201. In turn, application 201 is responsible for executing the application correctly. Hence, apptoms are in essence abstractions of the application program code whereas interpreted codes are merely another way of formulating the application code itself.

A traditional business computer application that has been thus converted from application software 101 to application data 201 first gains due to a drastic reduction in testing required. When properly defined, the application model 203 does not need to be changed as new functionality will use a combination of the existing code within organic architecture component 202. Since there is no new or changed procedural code, no conditional logic, no branching or looping, there is virtually nothing to test. A brief review (i.e., a data-type integrity verification) will confirm that the data that was entered corresponded to the "real world" of the problem domain.

A second significant advantage of the system in accordance with the present invention involves ease of maintenance. This is because each change to application model 203 changes some data about the application, but doesn't "break" the application. In contrast, removing or adding a single line of code in traditional software application 101 breaks the logical sequence of instruction execution and can easily prevent the application from functioning. Using the teachings of the present invention, a shared application can be created where parts of the application model 203 are in common (i.e., defined by a set a shared data) and each participating application or user can have personalizing additions to the data in application model 203 that defines their application. These personalizing additions can take the form of additional stored data types, as well as data which represents the way the application will be viewed and manipulated, for that user, for example. Moreover, the system can be changed while it is being used by saving data to application model 203, which varies from very difficult to impossible with prior technology.

Another advantage is that new functionality can be achieved simply by changing the applications-specific data in application model 203 (i.e., variable definitions, attributes, or class map data). In fact, the application can be modified while it is running because data can be saved into the existing apptom classes and/or new classes defined without a need to stop the execution of application 201.

The application system, since expressed in data, is indifferent to changes in underlying hardware 104, the database manager 106, operating systems 103 and 107. Hence, the OS-specific or hardware specific constructs on which the application is based can all be changed without affecting the application behavior. Of course, the hardware and OS have some impact in that a slow hardware component 104 will lead to a slower application, and if hardware 104 or OS 103 do not support some function (e.g., digitized sound), the application cannot implement behavior that requires these functions. The hardware and OS independence of the present invention make applications developed in accordance with the present invention desirable for complex and distributed application environments where up time, reliability, and low maintenance are of significant importance.

Because procedural application code does not need to be modified and compiled to implement new functionality, the system in accordance with the present invention can be rapidly adapted to new features and behavior without compromising the proven quality and robustness of the organic architecture component 202. Organic architecture component 202 can be extensively tested to ensure quality and reliability. Because the organic architecture component 202 does not change, the new functionality can be deployed rapidly with little or no additional verification.

Converting Applications to Data

A significant feature of the present invention is a system and methodology for taking an application developed in an "application domain" where applications have traditionally been developed by application programming, and constructing a new application, expressed entirely as data, and subject to the same laws of integrity as data.

Implementation Example

Figure 3:
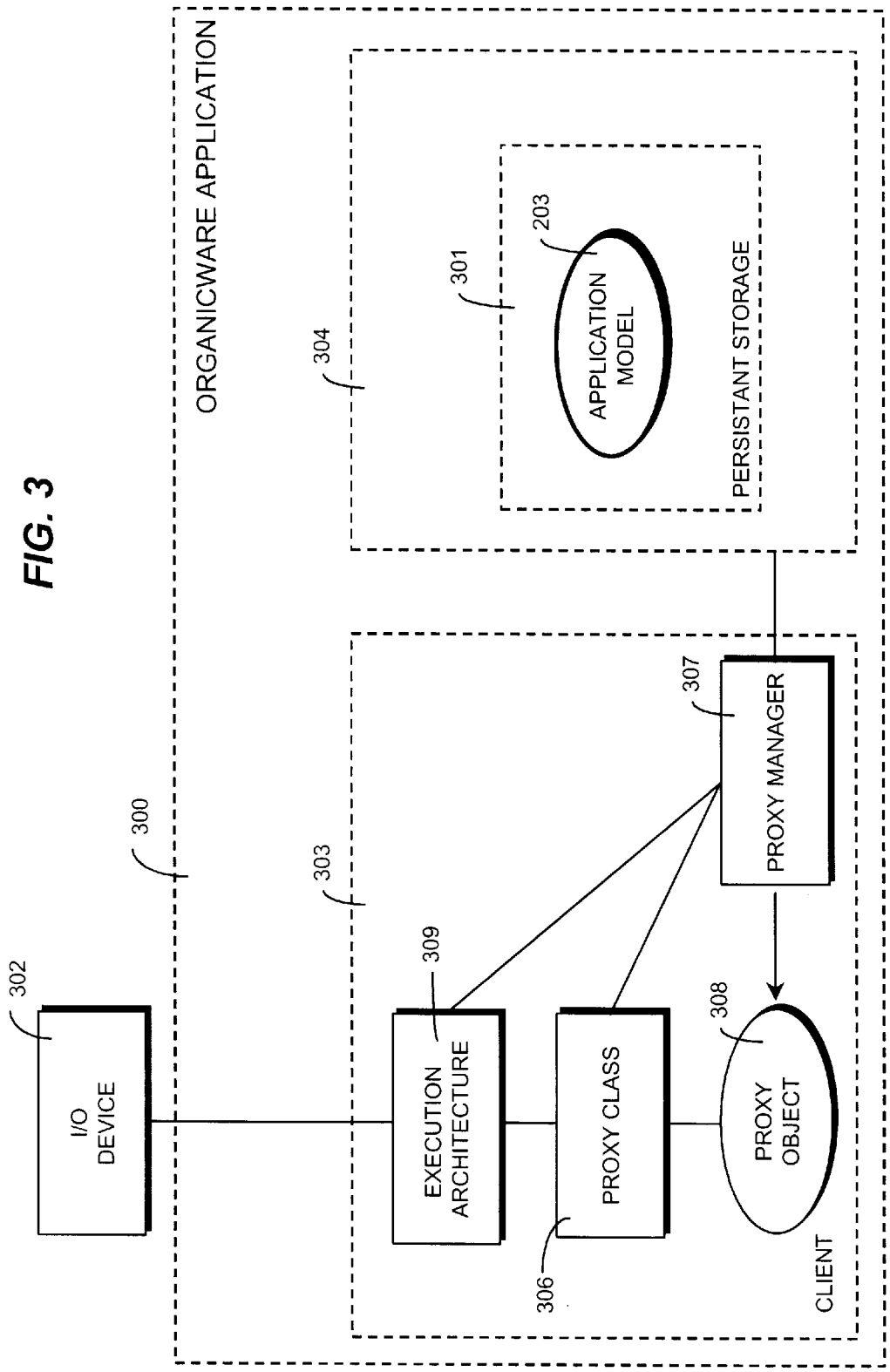
FIG. 3 shows major components of an OrganicWare application in accordance with the present invention.

FIG. 3 shows key components of an OrganicWare application 300 implemented in accordance with the present invention. Organic architecture component 202 (shown in FIG. 2) comprises a client-side component 303 and a server side component 304. Server side component 304 includes persistent storage 301 which as mentioned above could be a database management system or a simple file system. The application 300 comprises application model 203 expressed entirely in data in persistent storage 301.

Client side component 303 comprises an I/O device 302 (e.g., a CRT, LCD, or equivalent) and client software 303. An enabling feature of OrganicWare is the concept of a proxy. In traditional software in order for the I/O device 302 to interact with an application-specific object the application-specific object must be represented in the code. By an application-specific object it is meant, for example, an inventory record or a vendor record, or a billing record. In a COBOL application the code contains a "record" statement that represents the application-specific object. In object-oriented systems there is generally a class for each application-specific object, with code to manipulate the data within the application-specific object.

The proxy concept allows the present invention to use a single class (i.e., proxy class 306) that represents any application-specific object. As the client reads data from persistent storage 301, proxy manager 307 responds to the received data by creating a proxy object 308. On the client side, all proxy objects 308 are instances of the proxy class 306 either directly or through or one of its descendants (not shown). Proxy manager 307 may also perform other functions such as transaction management, cache management and keeping track of other data that has already been instantiated on the client. Execution architecture 309 is what keeps the application running, by dispatching event notifications from I/O device 302 and the operating system to the various targeted proxy objects 308 and proxy manager 307.

Figure 4:
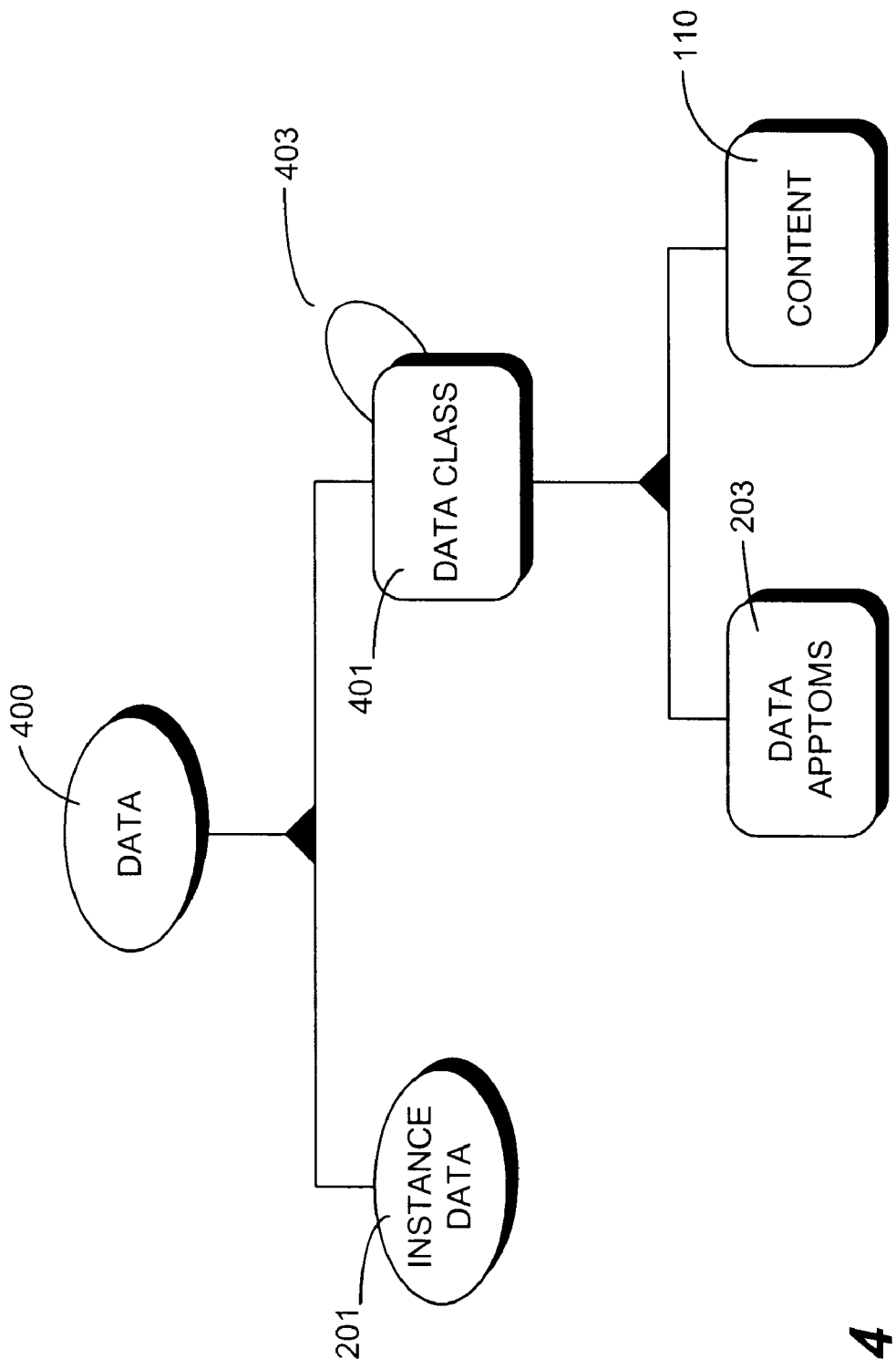
FIG. 4 shows the relationship of the data that defines the application and the data that forms the content of the application (in its persistent form)

FIG. 4 illustrates a conceptual diagram useful in understanding the types of data in an application in accordance with the present invention. Application data 201 and 203 are different from content data 105 and 110, but primarily in degree, not in kind. As FIG. 4 shows, application model data 203 and content data 110 are subclasses of the data class 401. Data class 401 and instance data (i.e., application 201) are subclasses of the generic data class 400.

In FIG. 4, the model data 203 is represented as data apptoms which are the atomic particles of an application. These are very small components that could be divided no further while retaining their class identity and referential integrity. They are much smaller than an Applet (a Java or Active X term) which is just a small program, and they are also distinguished from Applets in that Apptoms do not contain program code. Apptoms 203 and content 110 are all sub types of a common data type 401 and can have relationships 403 between any other data types whether they are data apptoms or content. This feature of the present invention makes the data integrity of the combined Apptoms and content possible.

Figure 5A:
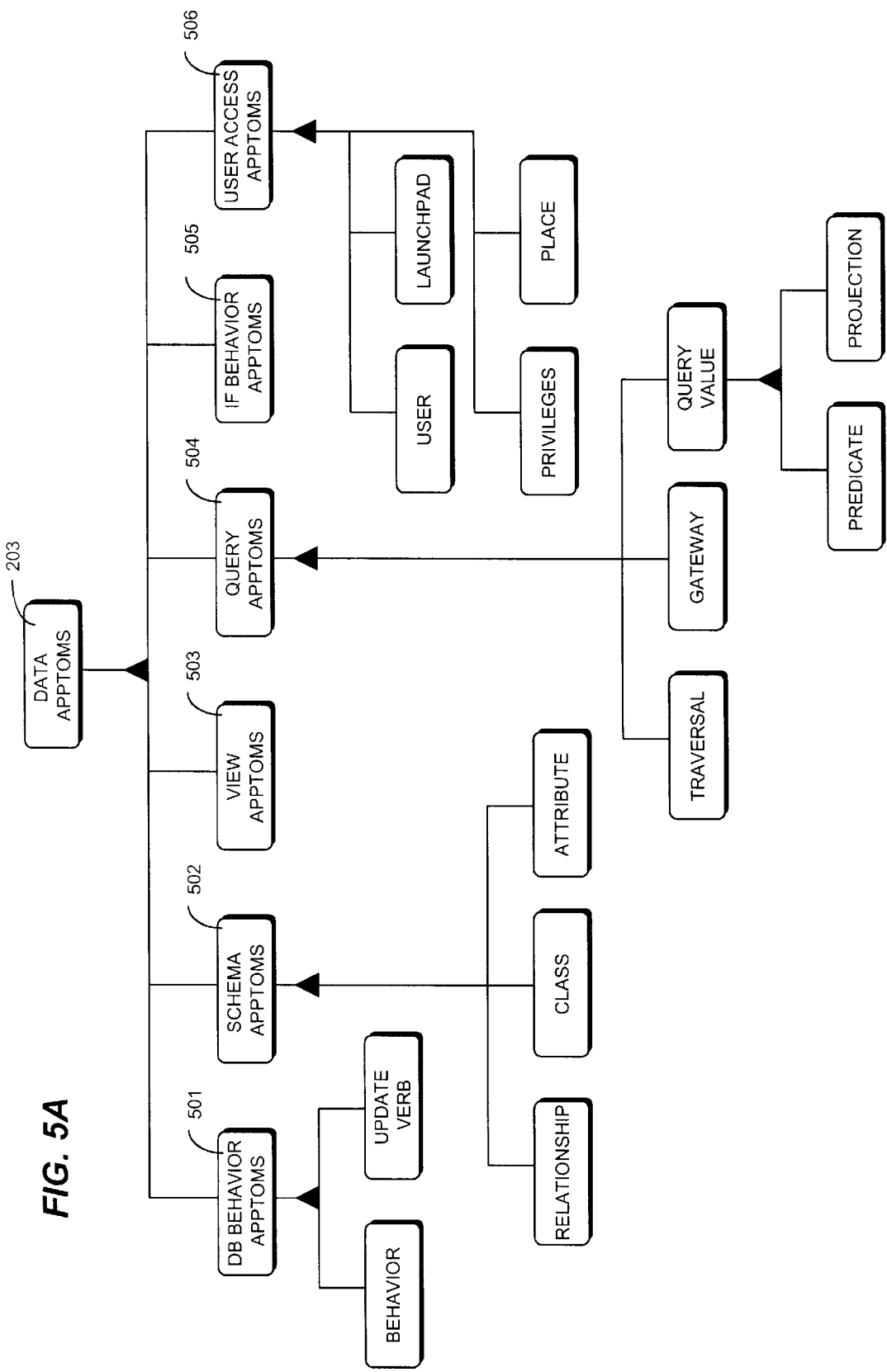
FIG. 5A shows major classes and subclasses of data apptoms, the basic building blocks of an OrganicWare application.

As shown in FIG. 5A, the exemplary implementation includes six main types or classes of data apptoms that are subclasses of the data apptom class 203. Database (DB) behavior apptoms 501 describe server side actions, and are analogous to triggers and constraints (described hereinbelow) or stored procedures in a database environment, with the exception that DB behavior apptoms contain no code, procedural or declarative. Major subclasses of the six main classes are also shown in FIG. 5A. These subclasses inherit attributes and behavior of their parent class. For example, the DB Behavior class 501 includes a behavior subclass and an update verb subclass, the features of which are described in relation to FIG. 6.

Schema Apptoms 502 contain descriptions of what is referred to as the logical schema. In accordance with the present invention, data can be stored in many different physical schemas (e.g., data could all be stored in a few very deep homogenous tables or it can be stored in an object database with a physical class per each logical class, depending on whether the persistent store can be changed as dynamically as the logical schema). There are three major types or subclasses of schema apptom class 502, class, relationship and attribute. In other words, for each class, each relationship, and each attribute that is possible in application 201, there is a corresponding schema apptom 502 that represents that class, relationship, or attribute. Creating a new class of application objects in application 201 is just a matter of creating an instance of a schema apptom 502 for the class, and then any relationships and attributes.

Query Apptoms 504 are taken up in more detail in U.S. patent application Ser. No. 09/023,167 assigned to the assignee of the present invention, filed concurrently herewith, and hereby incorporated by reference in its entirety. An important point is that query apptoms 504 are just like other data apptoms that are subclasses of data apptom class 203, in that they have been decomposed into atomic data particles. Unlike traditional queries which are stored and used as monolithic blocks of syntactic declarative text, a query in an OrganicWare Application is implemented as a tree of the smallest possible components (i.e. query apptoms 504) that describe each part of the query. This structure not only provides data integrity with the schema, but also provides data integrity with any other component using them such as the views. Query apptom class 505 includes gateway, value, and traversal types. The value type comprises further subclasses of projection and predicate. The details of these subclasses are not important for an understanding of the present invention, however, it should be understood that each subclass can serve as a source for data instances that implement the behavior described by the apptoms within a class or subclass.

View Apptoms 503 are similarly a set of all the decomposed descriptors needed to make a fully interactive, window-based graphic user interface. View apptoms 503 are freed from device-specific display characteristics by the device and resolution independent view layout as described copending U.S. patent application Ser. No. 09/023,364 assigned to the assignee of the present invention, filed concurrently herewith, and hereby incorporated by reference in its entirety.

Some other environments (Visual Basic, PowerSoft and NextStep, for instance) have an incomplete data representation of the user interface components. Even most compiled environments have a resource file where much of this information resides. In contrast with the present invention, in these examples each data representation is not a shared data representation. Hence, they do not allow the full range of user interface behavior to be expressed as data, as the present invention provides with the interface (IF) Behavior Apptoms 505. As described below, each IF Behavior Apptom 505 comprises a single Stimulus/Response pair, again referentially linked with the interface components it interacts with.

User access apptoms 506, provide a starting point for each user, a profile of what they can see and change, and data that represents what will be present on the screen for them when they initially log on. In a particular implementation, the basic system navigation comprises a series of places (represented by the place type) and launch pads (represented by the LP type) that provide iconic display of views and other tools that the user can initiate. This arrangement allows multiple different users to each log into a shared model (where the log-in behavior is represented by the user and privilege types), but see it as a completely custom application. If the user has some shared views they will see the same portion of an application as the other users that share that view. They may however have a plurality of non-shared views, and will therefore see a completely different looking application, with different interface behavior. For all intents and purposes they may think they are in a completely different application, tailored for their own use, except that wherever they share any part of the deeper model (the Schema or DB behavior for instance) they will be sharing data with any other user of the system. Updates made by one are immediately available to others.

Figure 5B:
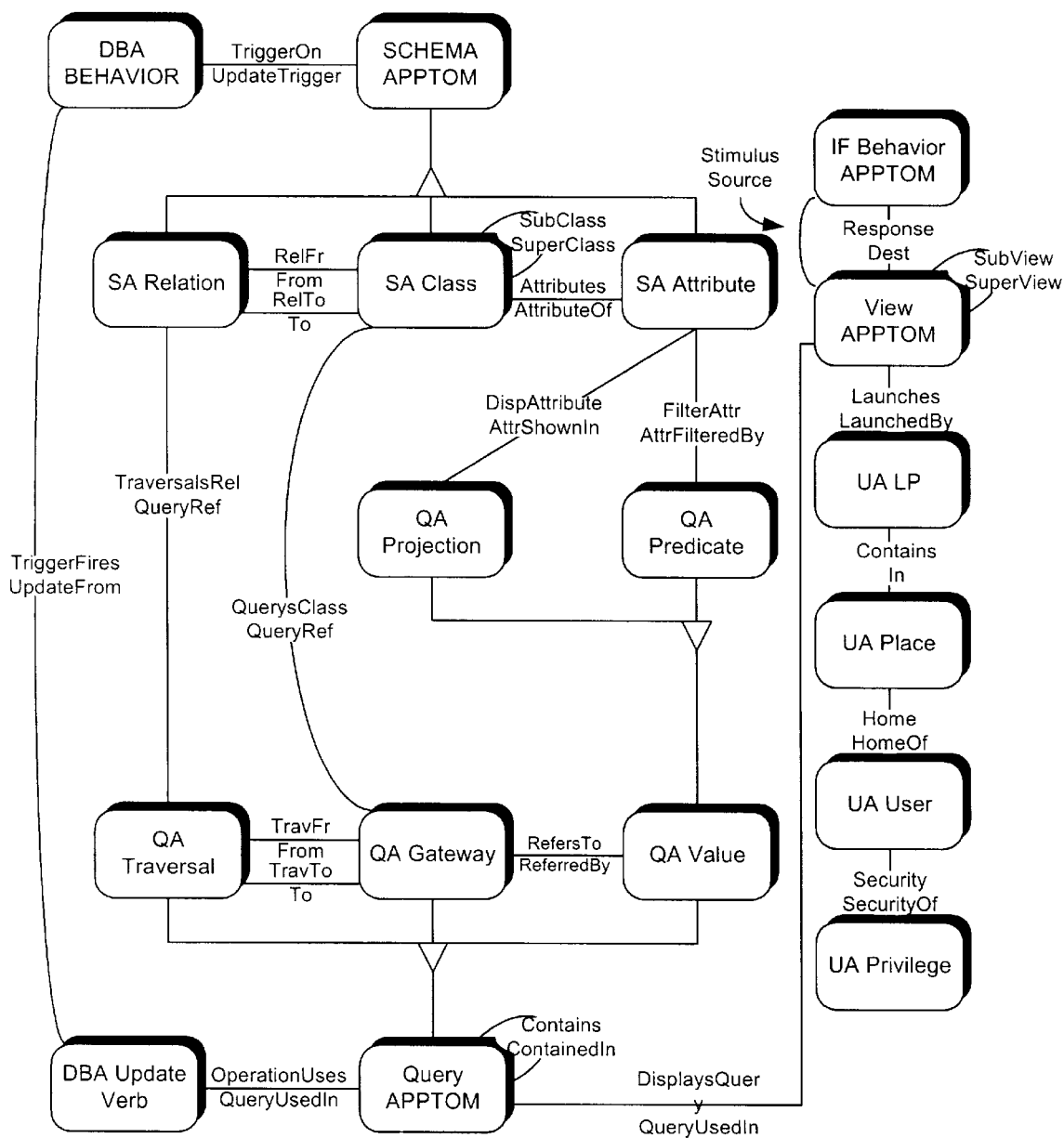
FIG. 5B shows an example set of relationships between the subclasses of data apptoms shown in FIG. 5A.

FIG. 5b shows an exemplary set of relationships between the subclasses shown in FIG. 5a. It should be understood that relationships can be created between any class or type of apptom to implement particular application behavior, and that FIG. 5B shows only an example relationship map that would provide a set of relationships sufficient to implement a wide variety of application behavior. Each of the relationships is illustrated in FIG. 5b as a named line. Each relationship defines the type of apptom on either side of the named line and thus enforces or determines how the data apptoms can be connected. For example, the schema apptom at the top of FIG. 5b can be connected only to a behavior type apptom by the trigger on update trigger relationship. FIG. 5b will not be described in exhaustive detail as the named relationships and subtypes that they connect are apparent. It is contemplated that other relationships will be added by application developers and that some relationships shown in FIG. 5b may be omitted in some instances, however, these variations are considered equivalent to the particular implementation shown in FIG. 5b.

Figure 6:
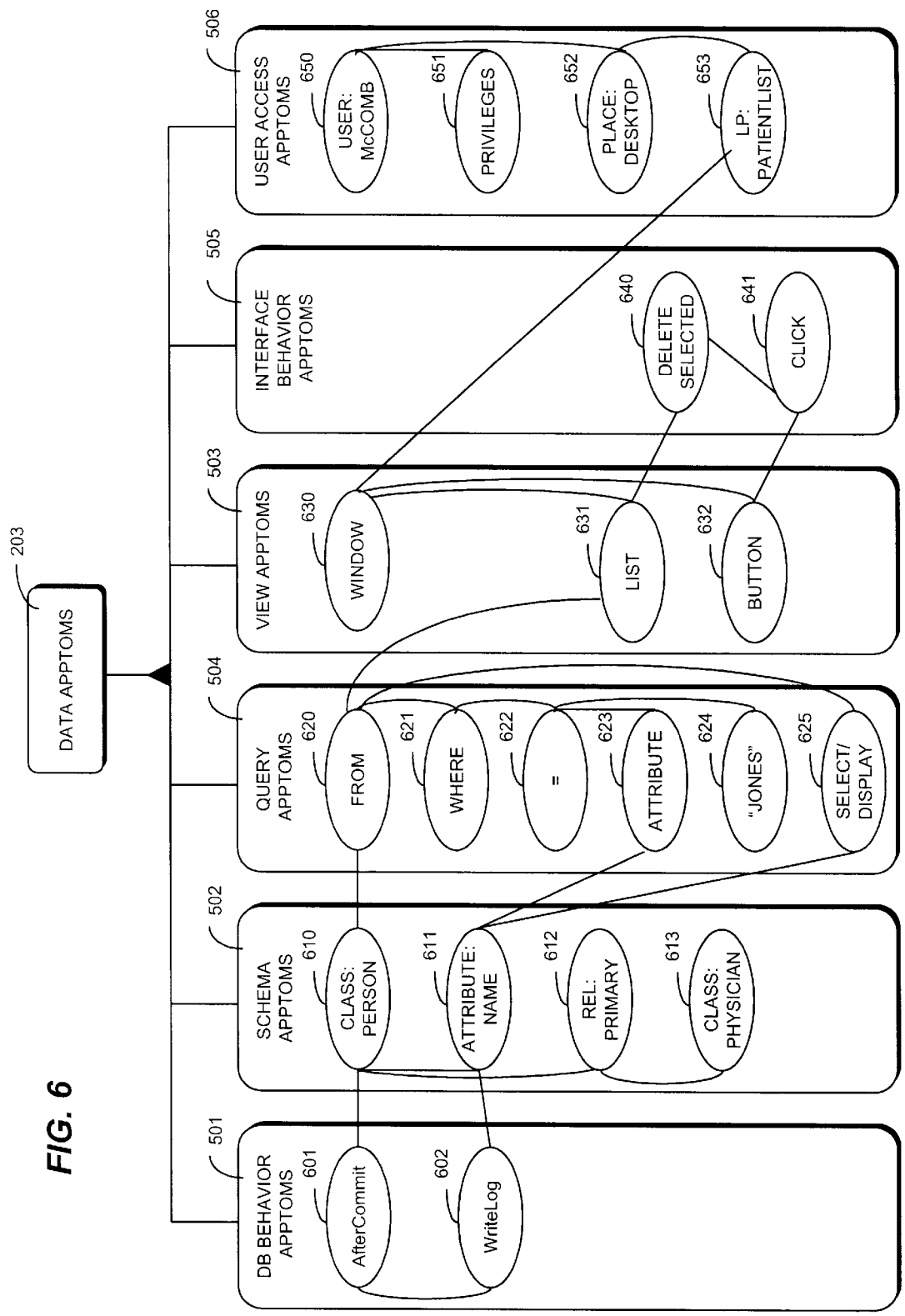
FIG. 6 shows an example set of data apptoms, and their interrelationship that creates the application as well as its data integrity.

FIG. 6 shows individual Apptom instances (601–653) aligned within the corresponding class of Apptom to which they belong. The lines between the apptom instances represent their relationships as implemented via the data relationship 403 and further defined by the Schema Relationship Apptom (a subtype of Schema Apptoms 502, not shown). The Apptoms (601–653) represent a small portion of a typical application, however, the example of FIG. 6 is useful to the understanding the differences between the present invention and conventional application development. It is important to realize that the apptom instances indicated in ovals in FIG. 6 are only examples of particular apptoms that are used in the particular example. In practice some apptom subclasses will comprise tens, possibly hundreds, of apptom types while other apptom subclasses may include only a few.

Typically the first thing to be done in application development is to define the schema. In this small example of FIG. 6, schema definition is done by setting up Schema Apptoms for two Classes (610 and 613) to represent Patients and Physicians. We add an Attribute apptom instance 611 to Patient apptom instance 610 to represent their name (as indicated by the line coupling instance 610 and instance 611). A relationship apptom instance 612 is added to Patient 610 to indicate that they can have a Primary Physician.

The Class, Attribute and Relationship establish and define what information is possible to store and retrieve about a Patient for the particular application 201 being created. There are other attributes set in these Schema Apptoms, such as whether the class is abstract, whether the attributes are required or indexed and their semantic type and the cardinality of the relationships, but none of these is essential for the implementation of the invention.

It may be desirable to create one of many possible triggers on a class. Triggers and constraints are a fairly common addition to most database management systems. To date they have been implemented in vendor specific syntax's (PL/SQL for Oracle, Stored Procedures for Sybase, an extended SQL for rDB etc.) Triggers and constraints are either expressed in declarative language (rDB) or procedural language (Oracle and Sybase). Prior applications have failed to reduced the triggers and constraints to data such as data apptoms 601 and 602. In so doing the present invention has achieved the referential integrity advantages described above as well as achieving database vendor independence. In the example of FIG. 6, a trigger 602 that writes a log containing the Patient Name immediately after any change 601 to any instance of Class Patient.

As described more fully in patent application XX/XXX, XXX, query apptoms 620–625 also are expressed as atomic data bits. In the example each apptom is identified by a term familiar to SQL programmers (e.g., Select, From and Where) but this is just to make the example more readable. The FROM apptom 620 at top of the query is the portion that defines in which classes of objects the application will look for our query matches in. In this case there is a predicate represented by query apptoms 621–624 which when executed will cause the query to only return objects where the Patients Name (represented by apptom 621 via apptom 623) is equal (represented by apptom 622) to the literal value "Jones" (represented by the literal apptom 624). Finally when the query runs we are only interested in looking at the patients name (represented by apptom 611 via 625). It should be understood that the present invention is readily adapted to display any other attribute.

Starting from the right side of FIG. 6 (i.e., user access apptoms 506), the act of logging in causes the system to retrieve an Apptom 650 that corresponds to the logged in user, in this case, user McComb. The identity of McComb as a user is associated with a series of privileges (represented by apptom 651) that control what access user McComb has to certain objects. Additionally user apptom 650 connects with McComb's home place (represented by apptom 652) which is referred to as a "desktop" where it connects me with the Launch Pads that represent tools that user McComb has access to (represented by apptom 653).

In the example of FIG. 6 the Launch Pad is connected to a window (represented by apptom 630) that contains a list (represented by apptom 631) that displays the query represented by apptoms 620–625 described hereinbefore. In addition to providing a place to view the query, this window also has a button (represented by apptom 632) where we have defined some user interface behavior. In the specific example a click (represented by apptom 641) on the button, causes the system to deleted any item in the list that was selected (represented by apptom 640).

An important feature of the present invention is that by assembling complex combinations of these apptom's capabilities a very vast array of functionality can be provided. Enough to satisfy all of the requirements of most business applications and most of the requirements of all business applications.

Figure 7:
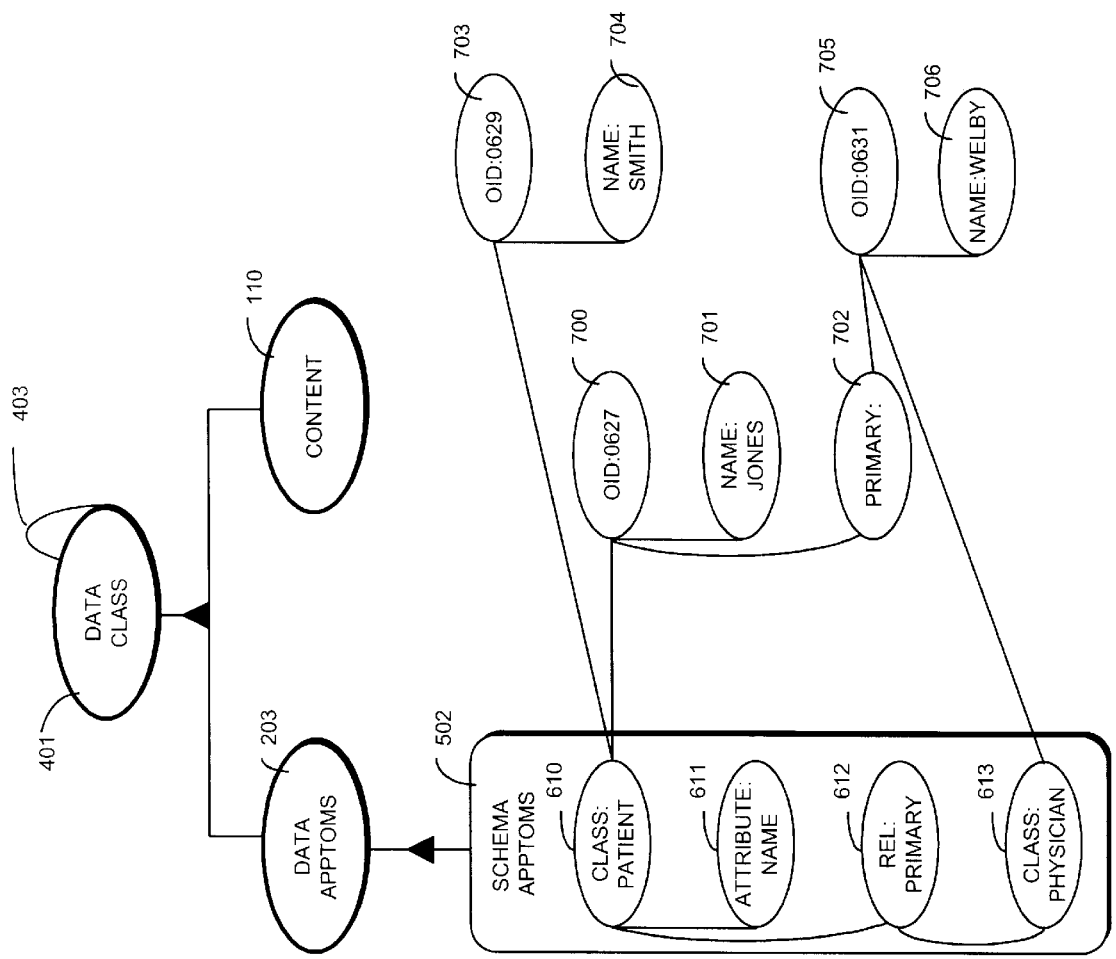
FIG. 7 shows how content data is integrated and linked with the Data Apptoms that defined it.

Note that in the example of FIG. 6 it is the lines connecting the apptoms that generate the possibility for referential integrity between all aspects of the application. The referential integrity of the application to itself is only part of the story (an important part, but only part). FIG. 7 illustrates the referential integrity between the apptoms and the content data using the same schema example as in FIG. 6 (i.e., apptoms 610–613). In FIG. 7, three content objects are added (represented by data instances 700–706) which include two patients and a physician in the particular example.

The term "OID" in data instances 700, 703 and 705, refers to an Object Identifier which is used to distinguish two objects if they happen to have the same attribute values. It should be noted that the instances of Patient (700 and 703) are tied directly to the class to which they belong (610). Although the class (610) is just data and normally could be deleted or changed, the presence of this relation keeps such deletion or modification from occurring. Note also the attributes (701, 704 and 706) and relation (702) could be directly linked as well, however, it is space and time efficient to use the class link to determine this.

Note also that the relation (702) between Jones (700) and his Physician (705) is direct. It is not necessary to store foreign keys and then do table joins at run time as is required in a purely relational system.

Figure 8:
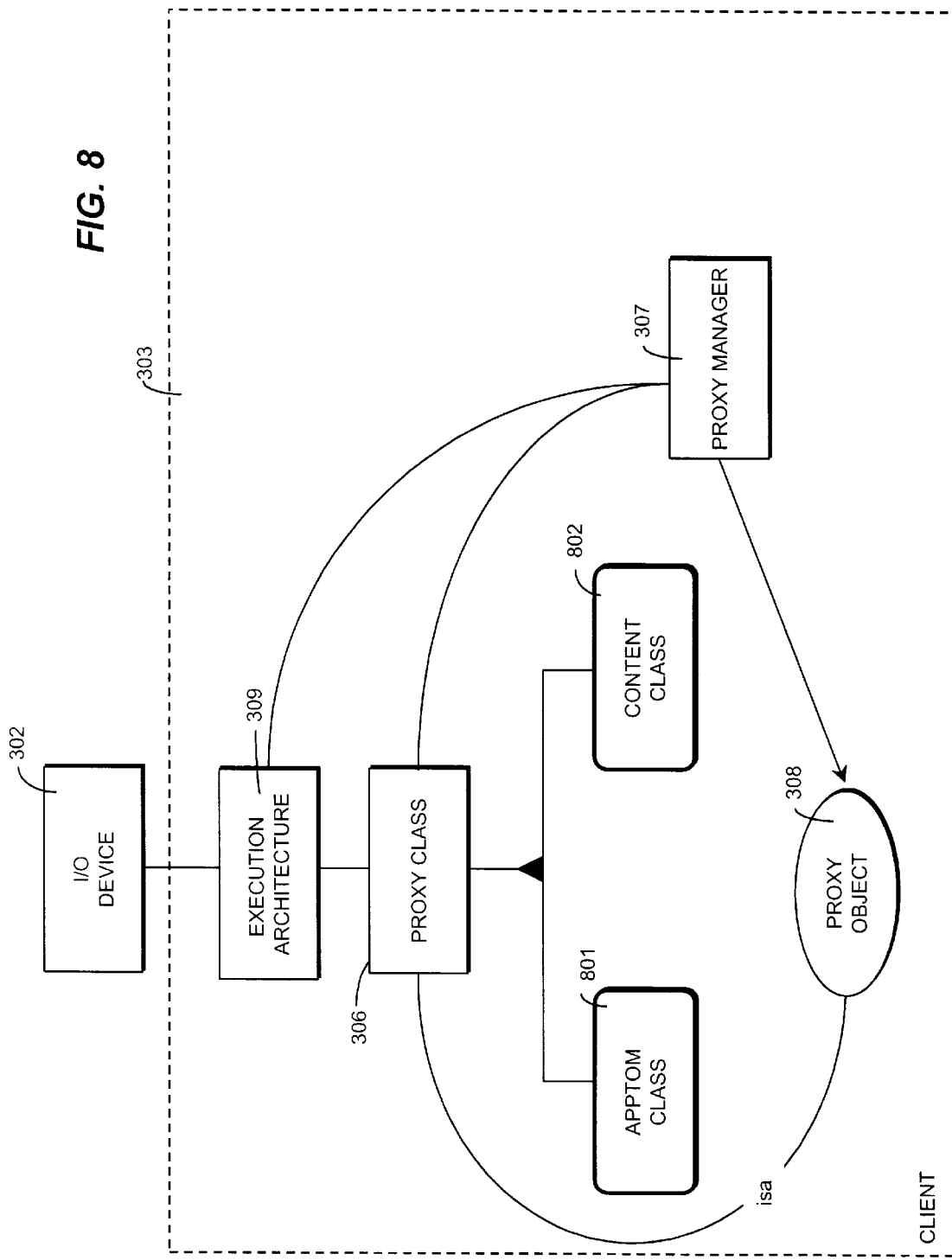
FIG. 8 shows key portions of a client delivery architecture in accordance with the present invention.

FIG. 8 describes where key architectural code is located and what functionally it must provide to make OrganicWare execute. The I/O device 302 is a typical computer user interface device, most typically a windows based GUI. The client 303 can be a single compiled program or a series of separate cooperating modules or even Applets. The additional detail added in FIG. 8 as compared to FIG. 3 shows Apptom Classes 801 and Content Classes 802 as two distinct types of Proxy Classes 306. All Proxy Objects 308 in the client are of type ProxyClass 306 and therefore can be treated uniformly for many purposes, but they will also be either an instance of an apptom class 501–506 or content class, and will get additional behavior as a result. Note that the Proxy Classes (306, 801 and 802) are coded, conventional object-oriented classes, with procedural code for methods.

Figure 9:
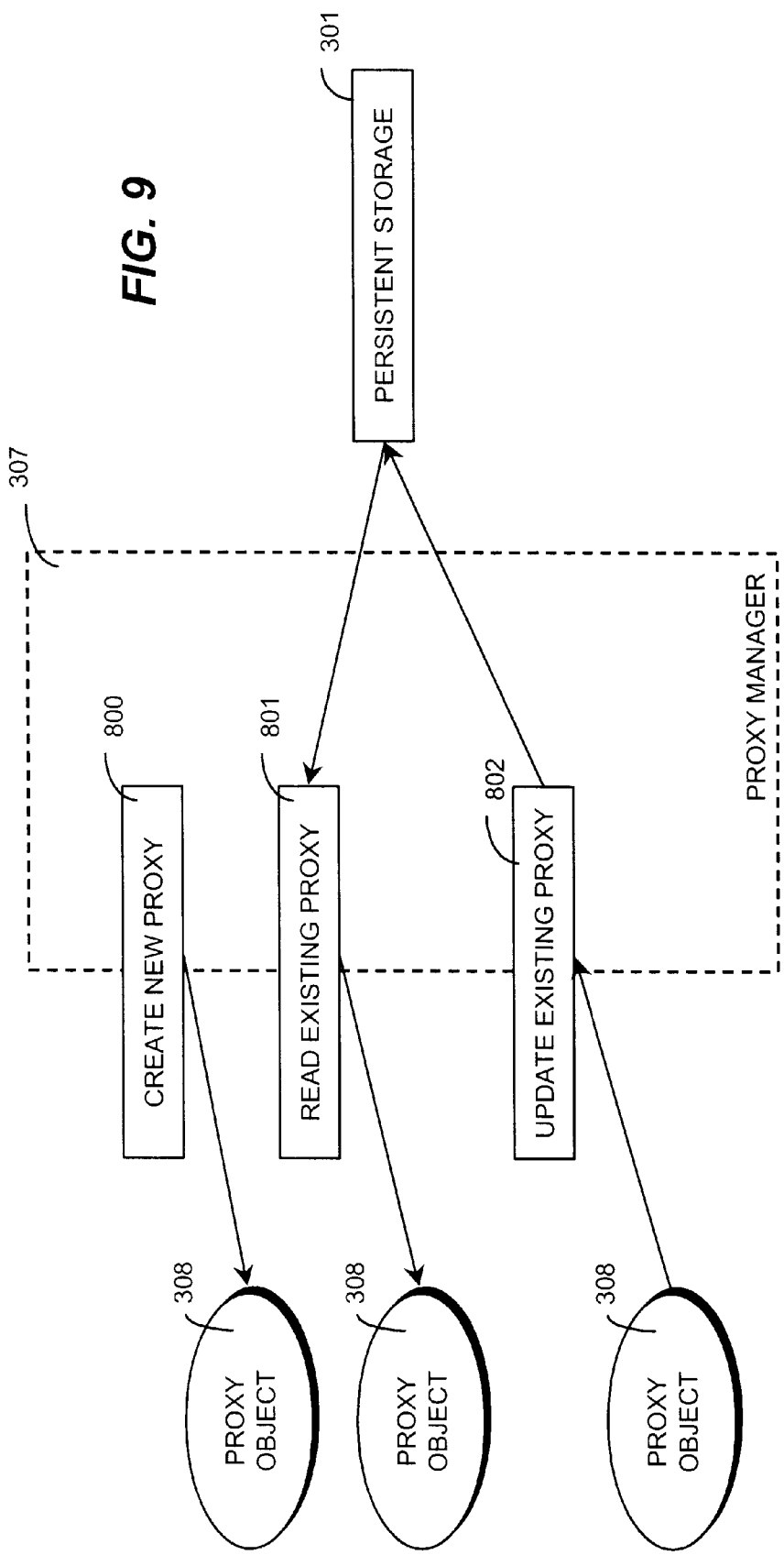
FIG. 9 shows key interfaces in a Proxy Manager component in accordance with the present invention.

FIG. 9 shows the key interfaces for the Proxy Manager 307. The proxy manager 307 is responsible for reading all persistent objects from the persistent store 301 and creating client-side equivalents. If the client action results in a request for a new proxy of a particular type, the proxy manager will be called at interface 800 and will create a new proxy 308 of the requested type. Similarly if a client process needs to read (interface 401) or update (interface 402) a proxy 110, proxy manage 307*r* will assure that the proper actions are executed to keep the client representation the same as the persistent one in persistent store 301. In the particular implementation the present invention uses explicit commits and atomic transactions to maintain synchronization between proxy objects 110 and the data in persistent store 301, but this is not essential for the purpose of the invention.

Figure 10:
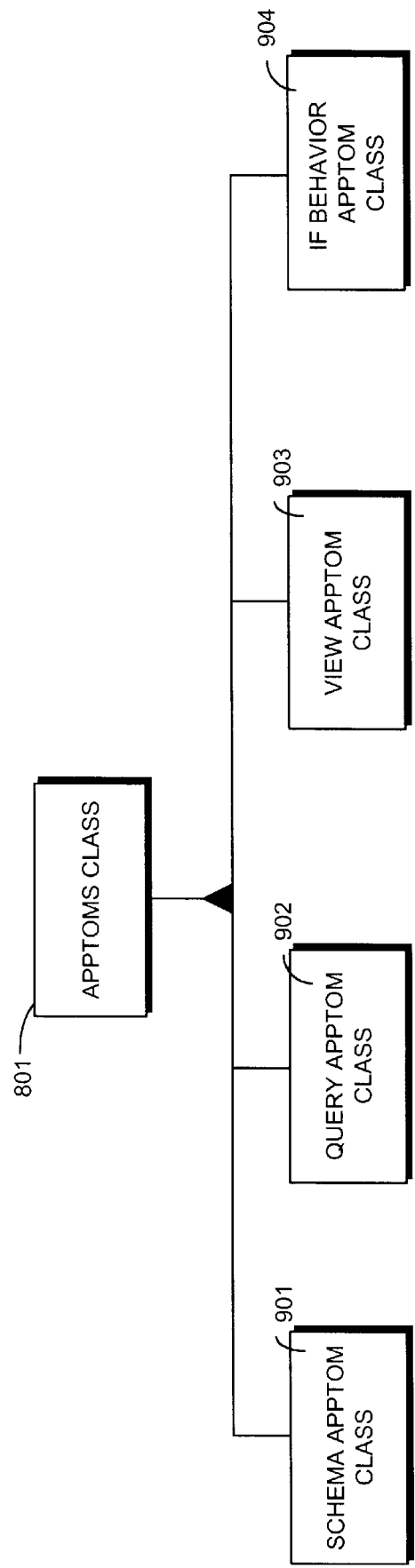
FIG. 10 shows five key client-side Apptom Classes, which instantiate the data apptoms as they come over from the persistent store.

In FIG. 10 we break out four significant client-side subclasses of apptom classes 801 shown in FIG. 8. In the particular example these subclasses each have a DB Instance analog however they need not, and in our implementation are not identically structured. The subclasses are: Schema Apptom 901 which keeps a client side "class map" which is a cached version of the Logical Schema, useful for creating tools to build or extend applications with. Query Apptom Class 902 is the top of a tree of classes that execute and maintain cursors in our data assembled queries. The view apptom class 903 creates a renderable version of the data, and the IF behavior Apptom Class 904 is where the stimulus/response behavior resides.

Figure 11:
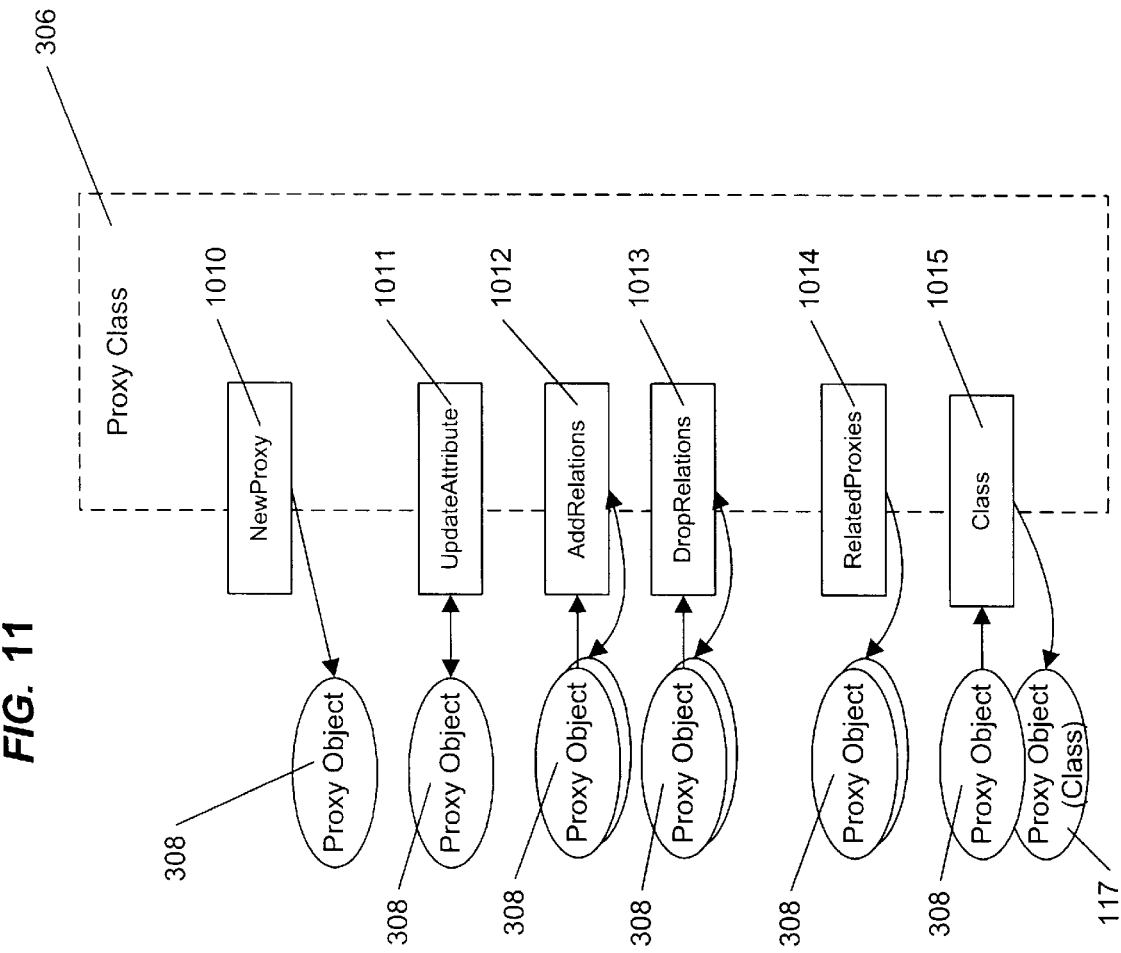
FIG. 11 shows key interfaces for the Proxy Class.

All Proxies share their "proxiness." FIG. 11 shows the key behavior this entails. Proxy class 306 includes the methods "NewProxy" (which creates a new instance of a proxy 110, "update attribute" (which updates an attribute in an existing proxy instance 110, "AddRelations" (which adds a relationship between two proxy instances 110, "DropRelations" (which deletes an already established relationship, and "RelatedProxies". By accessing the six methods (1010–1015) the present invention handles all the state manipulation of any type of proxy, apptom or content. Note that the method class (1015) returns a proxy 1017 that is like all other proxies (110), except this proxy 1017 happens to also be an instance of Schema Apptom 502.

FIG. 12 shows other key Apptom Classes and a the methods that identify their behaviors. In FIG. 12, the methods are labeled with descriptive terms that indicate the behavior implemented. The Apptom base class 203 ensures that every apptom instance has an interactive builder 1120 as well as a way to build it from its persistent version 1121. The execution tool interface 1123 makes sure that the apptom can execute (for example, execute the query that the query apptom is the head of). These methods are inherited by the apptom subclasses 502, 504, 503, and 505 described below.

The Schema Apptom Class 502 is responsible for evaluating instance type compatibility 1130 which is useful for automating type-safe drag and drop or remote insert. The attributes and relations available in methods 1131 and 1132 are useful when creating new proxies. The parent and children interfaces 1133 and 1134 are used in tool building and are also the basis for the type compatibility check.

The Query Apptom Class 504 is responsible for executing a query against the database 1140 and then managing the equivalent of a fetch cursor 1141–1142 or giving back a set at a time 1143. View Apptom Class 503 sets up the whole user interface. A view is composed of sub views 1150 and is generally looking at one or many proxies 1151 and has a query to connect it to the persistent store 1152. To set up the rendering routines the View Class can generate a displayable value from a proxy using method 1153. Much of the layout code is in this class, but detailed understanding is not essential for a complete understanding of the invention.

The user interface behavior class 505 (where a great deal of the coding in a system typically goes) is reduced to a series of stimulus/response pairs (interfaces 1160 and 1161) implemented in the IF Behavior Apptoms 505. The behavior is implemented using a publish/subscribe mechanism. When a stimuli (e.g., an event such as click, double click, drag initiate, lose focus, get focus, etc.) is recognized by the Execution Architecture component 309, and localized to the proxy of the view component (110a) that the event occurred in, it is dispatched using interface 1160 to the appropriate instance of the IF Behavior Apptom Class 505. The instance of the IF Behavior Apptom Class then initiates the response using method 1161 at the target proxy 110b. The range of responses include about 30 actions needed to support a number of different applications, none of which are not application specific, and include such things as disabling a window, launching a view, advancing the query cursor and the like.

FIG. 13 through FIG. 17 show an example of screen displays used in an actual implementation of the present invention in operation. These screen displays illustrate tools, rather than applications themselves that operate on and manipulate the persistent storage 301, although they illustrate various features of the architecture in accordance with the present invention.

Figure 13:
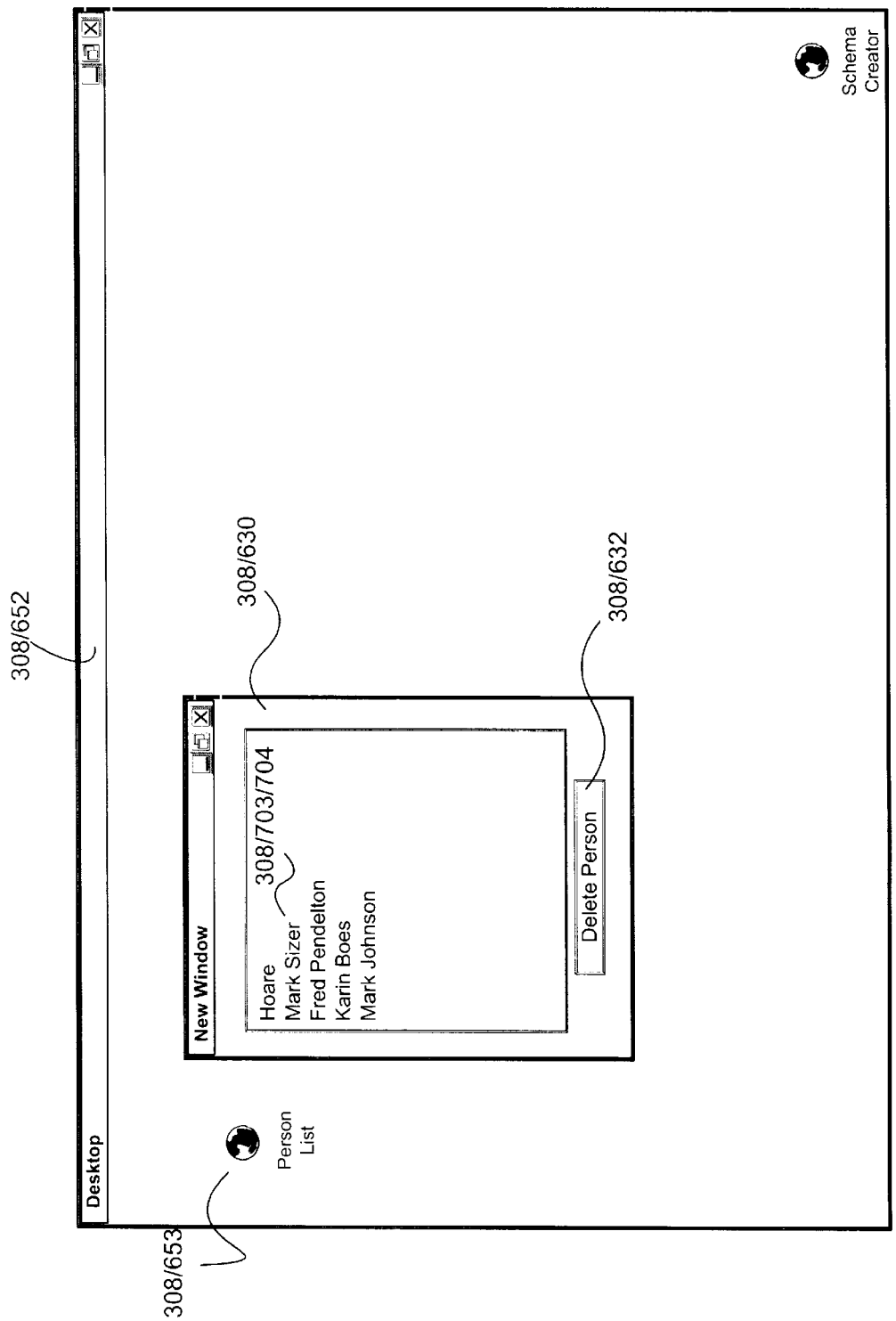
FIG. 13 through FIG. 17 show exemplary screen displays illustrating operation of an embodiment of the present invention.

FIG. 13 is a part of an application as an end user would see it. As mentioned before all the objects within the Organic Architecture are proxy objects, and we have numbered them 308. Each also represents a different content or data apptom object from the persistent store, and that number is also shown. This application shows a list of persons and allows the user to delete which ever one is selected. This is a very small scale model of a typical complex application, but it shows most of the key invention components.

Figure 14:
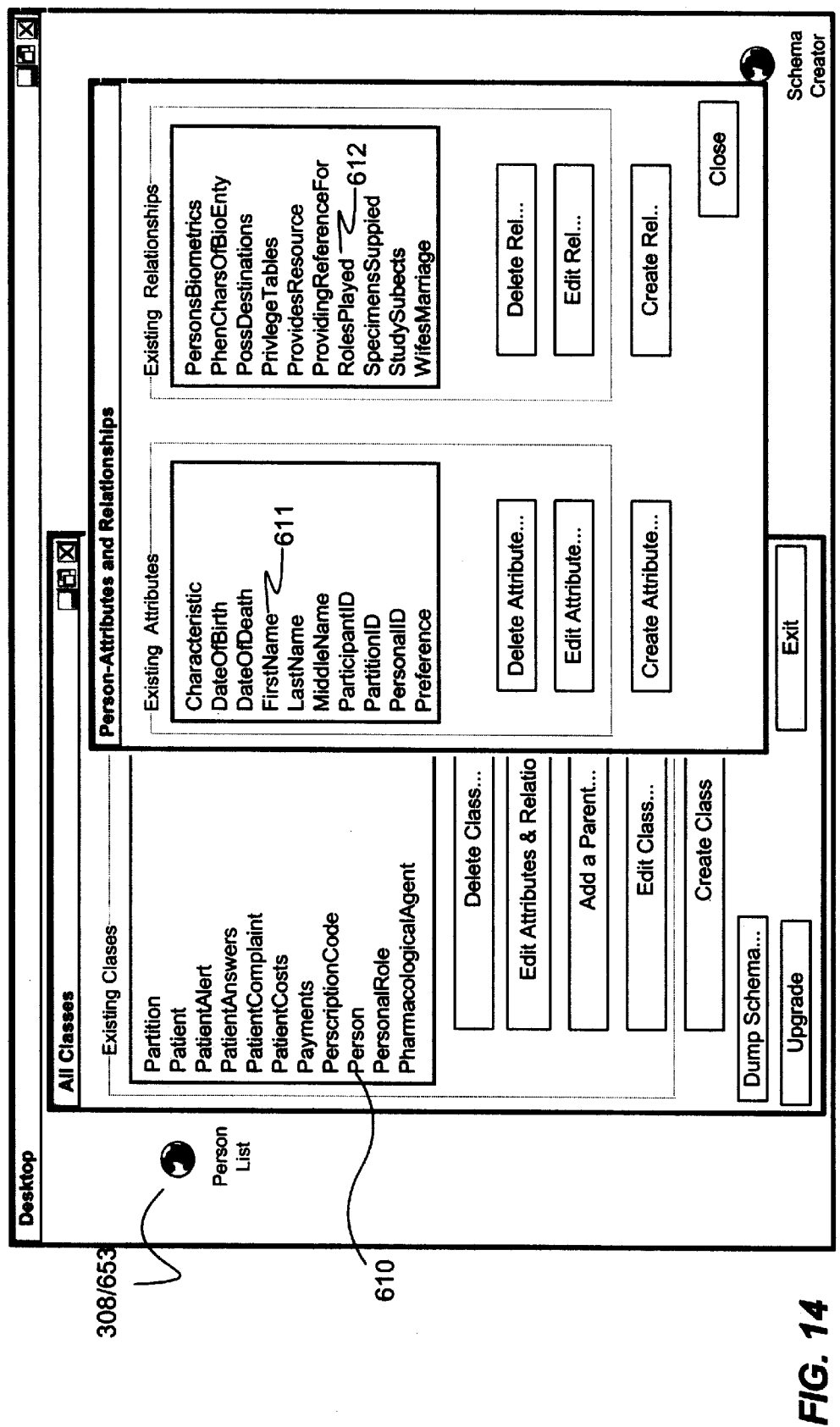

FIG. 14 shows a Schema Creator, a special tool that allows us to build persistent Schema Apptoms directly. In this example we see a list of the classes and 610 is highlighted. What we are looking at is the Schema Apptom Class instance for the Person Class. We also opened up the Window named "Person—Attributes and Relationships" and see the 611 which is the Attribute Apptom, and a list of relationship Apptoms 612. Making a change in the schema creator creates these schema apptoms and extends the schema for all the other users of the system.

Figure 15:
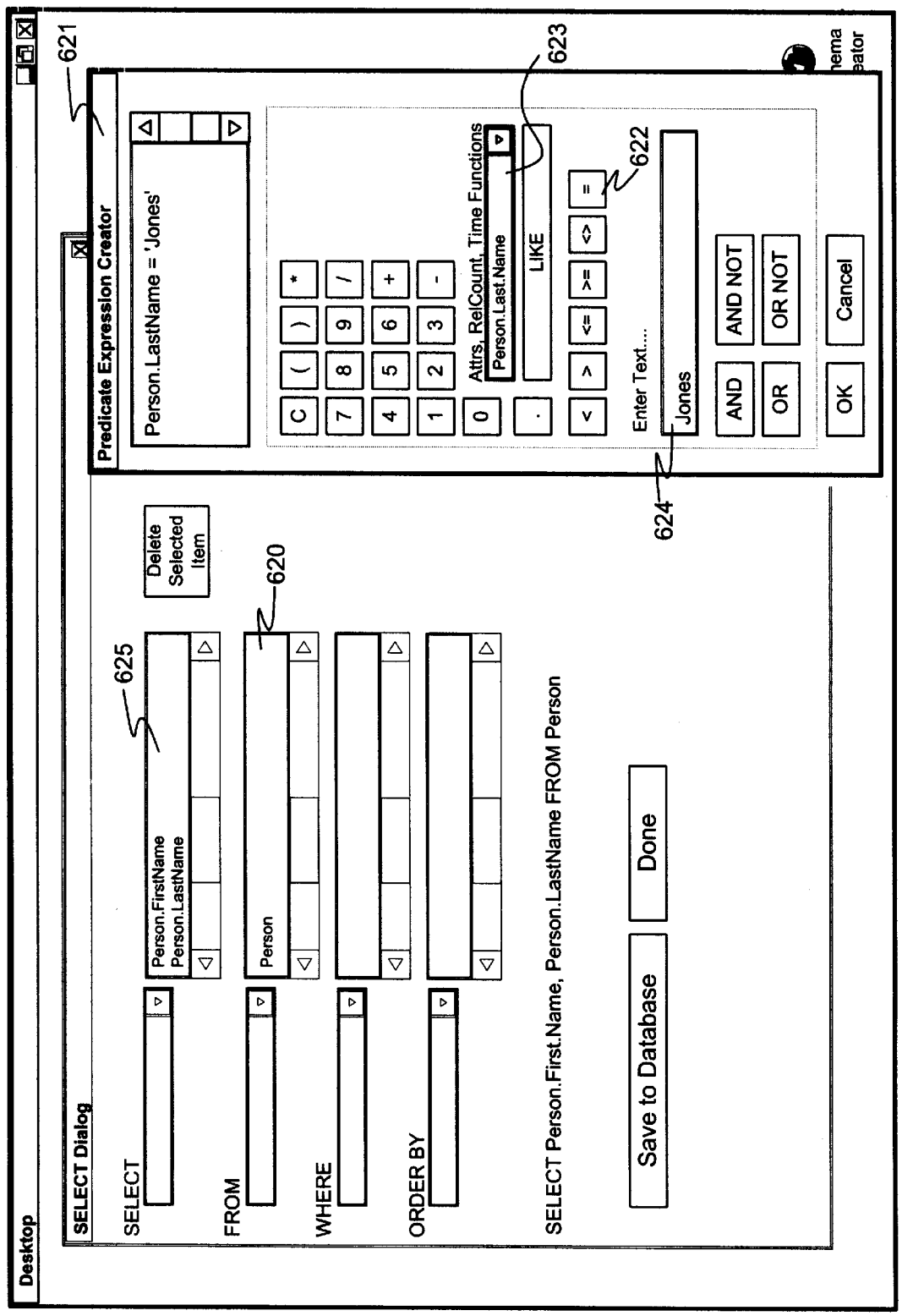

FIG. 15 shows a Query being constructed, and the Query Apptoms it is built of 620–625. Note: each of the apptoms exists separately in the database and can be edited separately.

Figure 16:
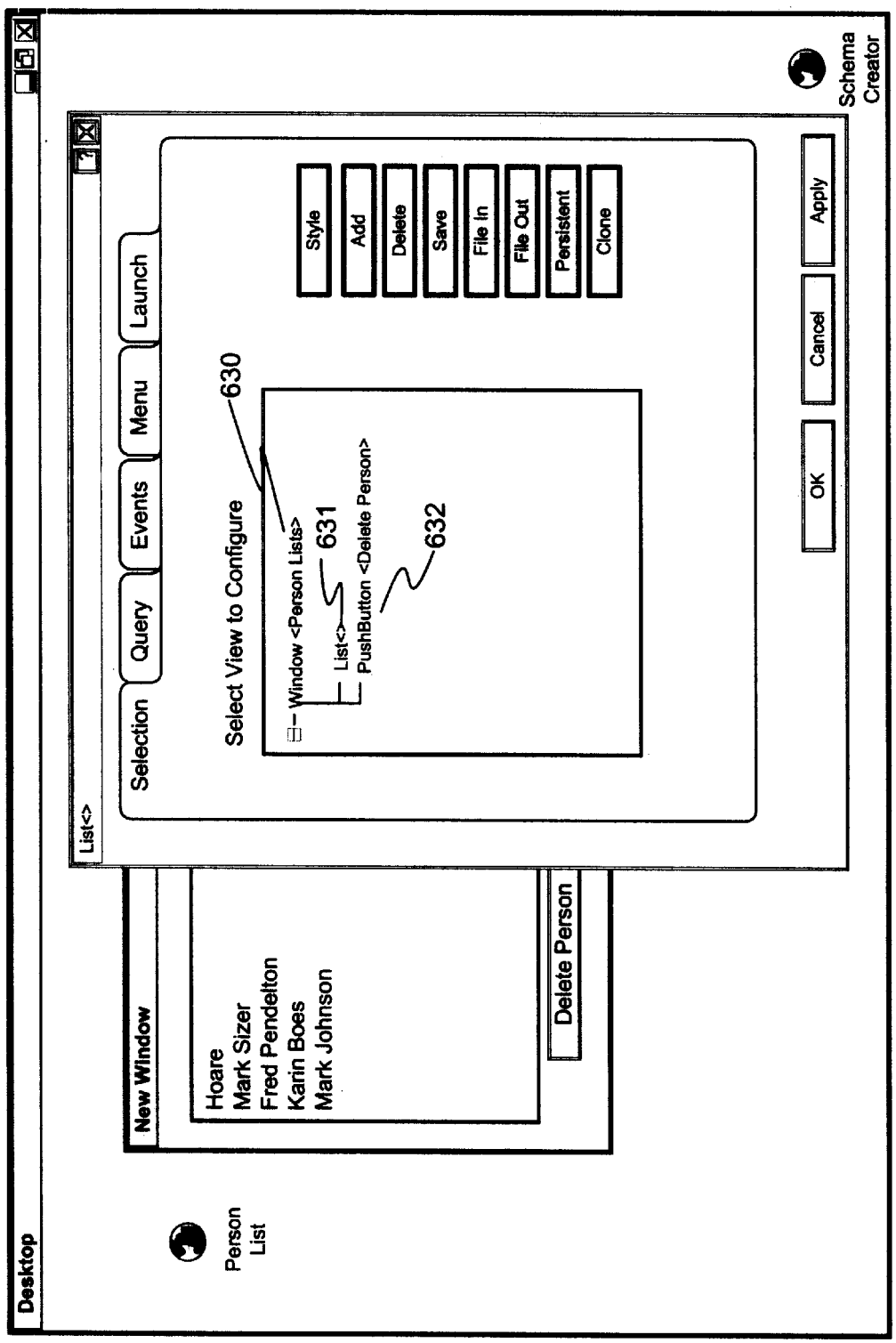

FIG. 16 shows the View Apptoms that define the View from FIG. 13. The Window 630 is made up of a List 631 and a Button 632.

Figure 16A:
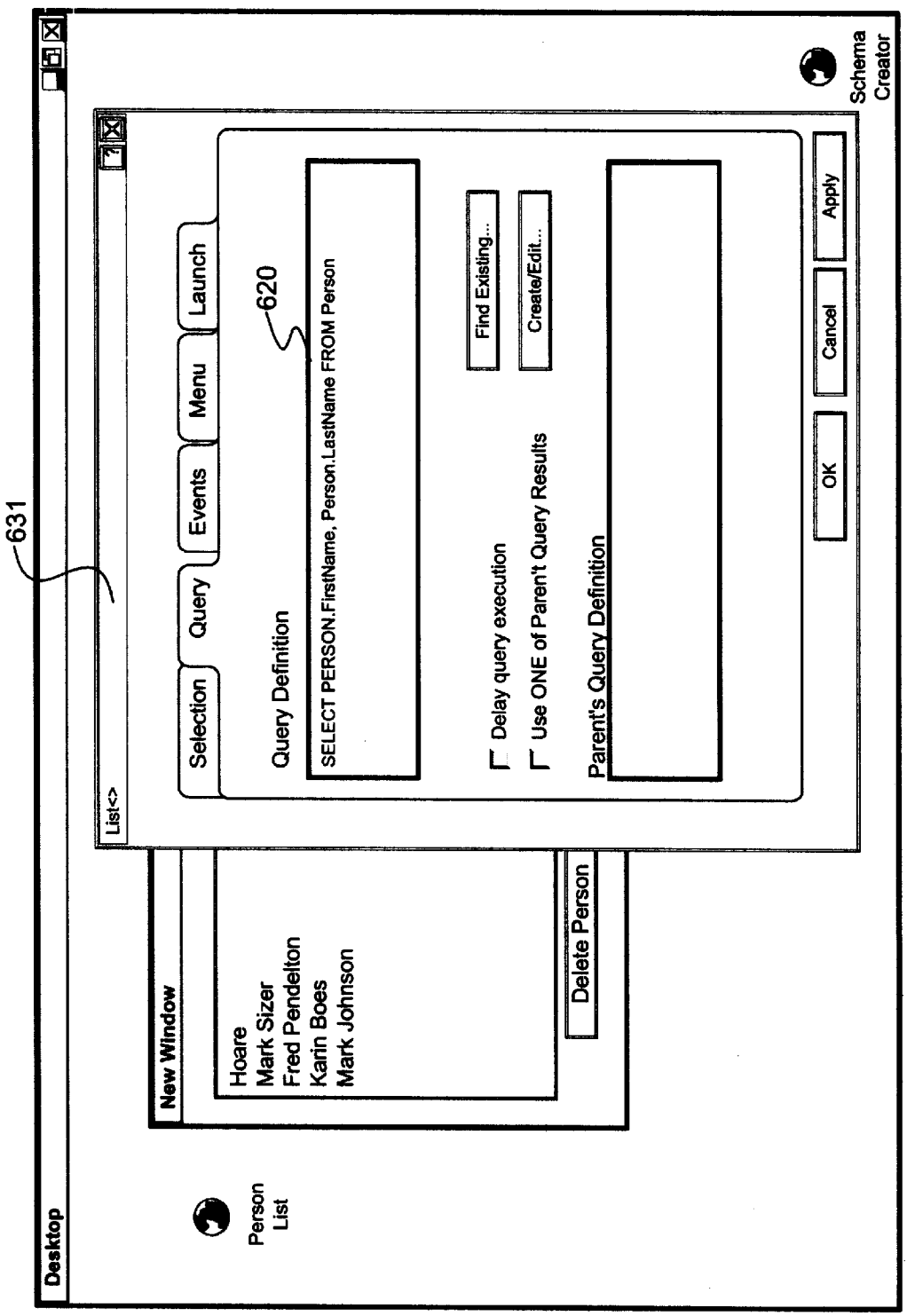

FIG. 16a shows how the List Apptom 631 is connected to the Query Apptom 620. The Query is shown in a traditional textual stream here for space saving, but it is not store that way.

Figure 17:
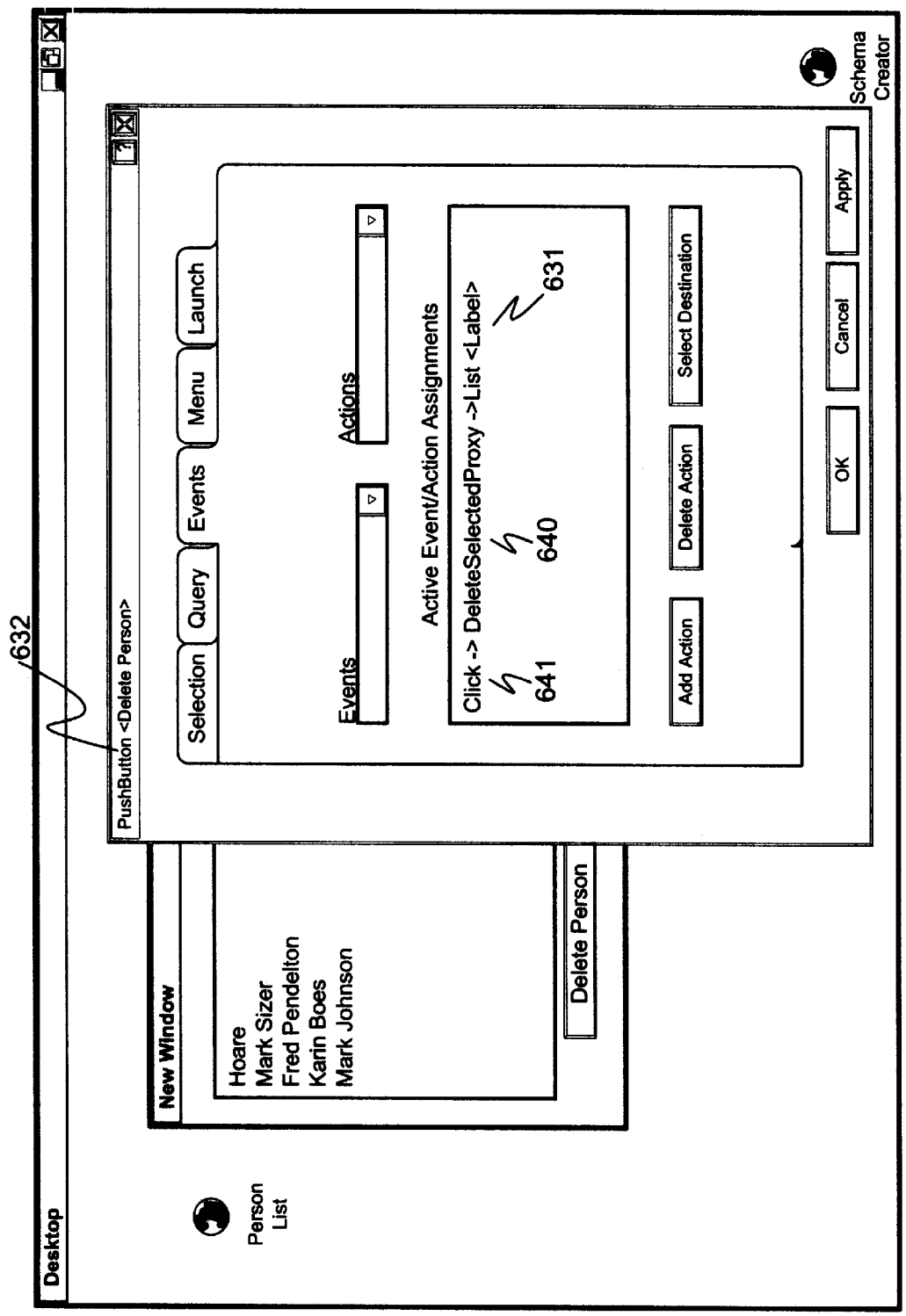

FIG. 17 shows how the interface behavior is connected to the view components. The Button 632 recognizes event click 641 which dispatches action DeleteSelectedProxy 640 to the List 631.

The specific example provided above illustrates the present invention in a DBMS application, however, the present invention is readily applied to other types of applications. Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method for implementing a multi-user software application on a computer system, the method comprising the steps of:
    defining a set of apptom classes, each apptom class defining attributes, relationships and responsibilities, the set of apptom classes including a schema, a class, query class, a view class, and an interface behavior class;
    storing an essential description of the application as data apptoms in a persistent store, each data apptom being a member of one of the set of apptom classes and having relationship and responsibility attributes of the class, the data apptoms being free of program constructs;
    executing application-independent code to connect to the persistent store using the computer system to access the data apptoms;
    instantiating the data apptoms in the computer system memory at application runtime, and
    executing application-independent architectural code to connect the instantiated data apptoms according to relationship data in each data apptom to create an instance of the application, wherein the executing application-independent code uses the data apptoms so that the connected data apptom instances exhibit the behavior of the application.

2. The method of claim 1 further comprising the step of: making changes to the application by only changing data in the data apptoms without adding any program code.

3. The method of claim 1 wherein the step of storing the data apptoms comprises storing each data apptom directly connected to at least one other of the data apptoms as well as content data so as to preserve referential integrity of the data apptoms and content data within the application.

4. The method of claim 3 further comprising a step of:

providing a class map comprising a plurality of data apptoms, wherein the data apptoms of the class map describe structure, display characteristics and validation rules of the content data.

5. The method of claim 4 further comprising the steps of:

storing the class map in the persistent store; and instantiating at least some of the data apptoms in the class map as proxy objects at run time.

6. The method of claim 1 further comprising the steps of:

constructing the data apptoms using a series of constrained choice interfaces to select component data for inclusion in each data apptom, the constrained interface limiting the data that can be included in to a particular data apptom based upon a predefined criteria, thereby assuring referential integrity of all the components of said software application.

7. The method of claim 1 wherein the step of storing further comprises:

providing a shared persistent storage device enabling access by multiple users; and connecting multiple computer systems to the shared persistent storage to access the data apptoms thereby enabling users of the multiple computer system to share portions of an application and content data.

8. A multi-user software application for use in a computer system implemented in one or more computer readable storage media, the application comprising:

a set of apptom classes, each apptom class defining attributes, relationships and responsibilities, the set of apptom classes including a schema class, a query class, a view class, and an interface behavior class;

a model of a business application saved as data apptoms in persistent storage, wherein each data apptom is a member of one of the set of apptom classes;

application independent computer program code devices operating on the computer system for accessing data from the model, and application independent computer program code devices operating on the computer system for initiating and controlling the execution of executable machine code in a manner determined from the data accessed, whereby the user of the system experiences the use of a full featured software application, for which there is no application specific programming code.

9. The application of claim 8 further comprising:

content data stored in the persistent storage, wherein the content data can be shared by multiple users, independent of whether they shared the same software application.

* * * * *